United States Statutory Invention Registration [19]

[11] Reg. Number: H583

Asami

[43] Published: Feb. 7, 1989

[54] SILVER HALIDE COLOR PHOTOGRAPHIC MATERIAL

[76] Inventor: Masahiro Asami, c/o Fuji Photo Film Co., Ltd., No. 210, Nakanuma, Minami Ashigara-shi, Kanagawa, Japan

[21] Appl. No.: 503

[22] Filed: Jan. 5, 1987

[30] Foreign Application Priority Data

Jan. 8, 1986 [JP] Japan ..... 61-1865

[51] Int. Cl.[4] ..... G03C 1/30; G03C 1/34; G03C 1/20; G03C 1/40

[52] U.S. Cl. ..... 430/550; 430/572; 430/573; 430/574; 430/576; 430/626

[58] Field of Search ..... 430/550, 572, 573, 574, 430/576, 626

[56] References Cited

U.S. PATENT DOCUMENTS

| | | | |
|---|---|---|---|
| 3,849,147 | 11/1974 | Shiba et al. | 430/574 |
| 3,953,215 | 4/1976 | Hinata et al. | 430/574 |
| 4,018,610 | 4/1977 | Hinata et al. | 430/574 |
| 4,152,163 | 5/1979 | Sato et al. | 430/574 |
| 4,212,672 | 7/1980 | Mihara et al. | 430/572 |
| 4,232,118 | 11/1980 | Okauchi et al. | 430/550 |
| 4,414,306 | 11/1983 | Wey et al. | 430/567 |
| 4,607,006 | 8/1986 | Hirano et al. | 430/572 |
| 4,618,570 | 10/1986 | Kadowaki et al. | 430/626 |
| 4,661,441 | 4/1987 | Kajiwara et al. | 430/626 |
| 4,734,358 | 3/1988 | Takada et al. | 430/550 |

*Primary Examiner*—John F. Terapane
*Assistant Examiner*—Susan Wolffe

[57] ABSTRACT

A silver halide color photographic material having, on a support, at least one light-sensitive emulsion layer containing a silver chlorobromide emulsion (having a chloride content of 80 mol % or less) substantially free of iodide, with the silver chlorobromide emulsion being spectrally sensitized with a combination of at least two kinds of spectral sensitizing dyes having specified formulae, and with the silver chlorobromide emulsion layer being hardened with at least one 1,3,5-triazine derivative having specified formula, whereby achieving inhibition for increase in fog upon long-range preservation thereof as finished goods without attended by decrease in developing speed.

28 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIAL

FIELD OF THE INVENTION

The present invention relates to a silver halide color photographic material which causes slight changes in properties when preserved as finished goods, that is, which is excellent in keeping stability. The present invention can fully achieve its effect when applied to a silver halide photographic material for color photographic printing paper.

BACKGROUND OF THE INVENTION

In order to reproduce natural colors by confering spectral sensitivity on a silver halide photographic emulsion, various methine dyes, such as a cyanine dye, a merocyanine dye, etc., are employed individually, as a mixture, or in combination with a supersensitizer.

Useful cyanine dyes are classified as monomethine dyes, trimethine dyes (carbocyanine dyes), pentamethine dyes (dicarbocyanine dyes) or so on according to the length of thier methine chains, and they are employed as spectral sensitizing dyes for a blue-sensitive layer, a green-sensitive layer or a red-sensitive layer according to wavelengths at which they have their own spectral absorption.

Moreover, some of these dyes, e.g., a monomethine dye and a carbocyanine dye, are known to be used as a mixture (e.g., Japanese Patent Publication No. 1762/73, Japanese Patent Application (OPI) Nos. 28826/75, 14313/76 and 153926/83 (the term "OPI" as used herein refers to a "published unexamined Japanese patent application")

In silver halide photographic materials for color photographic printing paper, substantially iodide-free silver halides, such as silver chloride, silver bromide, silver chlorobromide and the like, are preferably employed as silver halide to constitute a lightsensitive emulsion layer. One of the reasons for the preference is that silver halides of the above-described kind can provide contrasty silver halide emulsions capable of producing images of high contrast by using the possible small amount of silver. A deeper reason is that such silver halides can confer a high developing speed and excellent processability on silver halide emulsions. In addition, substantially iodide-free silver halide emulsions are known to have a high desilvering speed in the bleach-fix processing subsequent to the color development processing, and, therefore, to be suitable for color photographic printing paper.

However, silver chlorobromide emulsions, though possessed of excellent properties as described above, tend to cause changes in properties when preserved as finished goods, particularly an increase in fog upon long term preservation. This tendency is observed prominently in silver chlorobromide emulsions having a chloride content raised in order to increase a developing speed, which is a serious problem from the standpoint of supplying products having stable properties. At present, it is an important subject to solve this problem.

As a means for making improvement in keeping quality, several methods have been proposed up to the present. For instance, it is well known that the addition of compounds which have so far been employed as so-called stabilizers, such as azoles, mercapto compounds, azaindenes, etc., brings about the improvement in keeping quality, and examples thereof are described in detail in E. J. Birr, *Stabilization of Photographic Silver Halide Emulsions,* Focal Press (1974).

As the results of our studies, however, it has been found that in general the above-described azoles, mercapto compounds and azaindenes, which have been employd as a stabilizer, are compounds of the kind which are strongly adsorbed by silver halide grains and, therefore, they can produce marked effects on stabilization of photographic properties and prevention of fog, while when they are used in an increased amount, it happens that they have undesirable side effects also, e.g., desensitization and decrease in contrast, which are caused by a hindrance to the adsorption of the foregoing additives like spectral sensitizing dyes to silver halides, inhibition of desilvering upon bleach-fix processing, and so on. In particular, when used with the intention of preventing silver chlorobromide emulsion from increasing fog upon preservation, the foregoing compounds cannot function as effective means in many cases because of the restriction as described above.

SUMMARY OF THE INVENTION

Therefore, an object of the present invention is to provide a silver halide color photographic material in which changes in properties upon preservation as finished goods, particularly an increase in fog, are inhibited, that is, excellent keeping stability is ensured.

Another object of the present invention is to provide a silver halide color photographic material which has not only excellent keeping stability, but also high color developing speed, excellent processability and, further, high desilvering speed in a bleach-fix processing subsequent to a color development processing.

Through our researches on the above-described subjects, it has now been found that the objects of the present invention can be attained with a silver halide color photographic material which comprises a support having provided thereon at least one light-sensitive emulsion layer containing a substantially iodide-free silver chlorobromide emulsion, wherein at least one of the light-sensitive emulsion layers containing a silver halide emulsion sensitized spectrally with a combination of at least one compound represented by the general formula (I-A), (I-B) or (I-C):

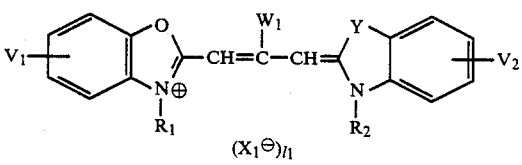

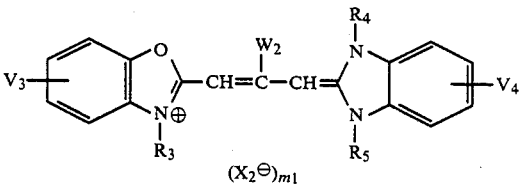

-continued

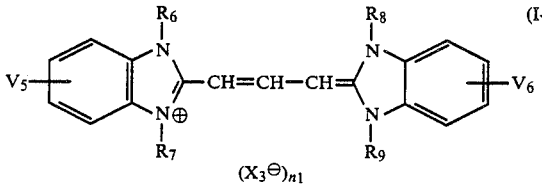

(I-C)

wherein $W_1$ and $W_2$ each represents a hydrogen atom, or an alkyl group; $V_1$ and $V_2$ may be the same or different, and $V_3$ and $V_4$ may be the same or different, and each represents a hydrogen atom, a halogen atom, an alkyl group, an aryl group, an alkoxy group, an amido group, an alkoxycarbonyl group or a cyano group, and, further, $V_1$, $V_2$ and $V_3$ may be a condensed benzene ring; $V_5$ and $V_6$ may be the same or different, and each represents a hydrogen atom, a halogen atom, an alkyl group, an alkoxy group, an amido group, an alkoxycarbonyl group or a cyano group; the number of each substituent represented by $V_1$ to $V_6$ which may be present in a molecule is one or more; $R_1$, $R_2$, $R_3$, $R_4$, $R_5$, $R_6$, $R_7$, $R_8$ and $R_9$ each represents an alkyl group, an alkenyl group or an aralkyl group, each of which may be substituted with a sulfo group, a sulfonate group, a carboxyl group, a carboxylate group or a hydroxyl group directly or through a divalent alkoxy group; Y represents an oxygen atom or a sulfur group; $X_1$, $X_2$ and $X_3$ each represents a counter ion which can suffice for neutralization of charges in each molecule; $l_1$, $m_1$ and $n_1$ each represents 0 or 1, and $L_1$, $m_1$ and $n_1$ are 0 when the molecules form an inner salt; and at least one compound represented by the general formula (II-A) or (II-B):

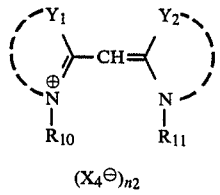

(II-A)

wherein $Y_1$ and $Y_2$ each represents atomic groups necessary to constitute a benzoxazole nucleus, a naphthoxazole nucleus, a benzothiazole nucleus or a naphthothiazole nucleus, each of which may be substituted with a halogen atom, a hydroxyl group, an alkyl group, an alkoxy group, an aryl group, a cyano group, a nitro group or an alkoxycarbonyl group; $R_{10}$ and $R_{11}$ each represents an alkyl group, an alkenyl group or an aralkyl group, each of which may be directly substituted with a sulfo group, a sulfonate group, a carboxyl group, a carboxylate group or a hydroxyl group, or indirectly substituted therewith through a divalent alkoxy group; $X_4$ represents a counter ion which can suffice for neutralization of charges in the molecule; and $n_2$ represents 0 or 1, and $n_2$ is 0 when the compound forms an inner salt;

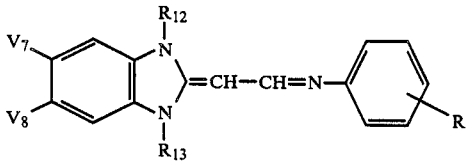

(II-B)

wherein $R_{12}$ and $R_{13}$ each represents an alkyl group, an alkenyl group or an aralkyl group, each of which may be substituted with a sulfo group, a sulfonate group, a carboxyl group, a carboxylate group, or a hydroxyl group directly or through a divalent alkoxy group; $V_7$ and $V_8$ may be the same or different, and each represents a hydrogen atom, a halogen atom, an alkyl group, an aryl group, an alkoxy group, an amido group, an alkoxycarbonyl group or a cyano group; and R has the same meaning as $V_7$ or $V_8$; and being hardened with at least one compound represented by the general formula (III) and/or at least one compound represented by the general formula (IV):

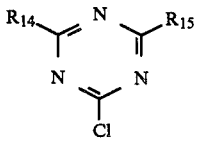

(III)

wherein $R_{14}$ and $R_{15}$ each represents a chlorine atom, —OM, wherein M represents a hydrogen atom or a monovalent metal atom, an alkyl group, an alkoxy group,

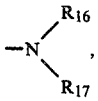

wherein $R_{16}$ and $R_{17}$ each represents a hydrogen atom, an alkyl group or an aryl group, or —$NHCOR_{18}$, wherein $R_{18}$ represents a hydrogen atom, an alkyl group, an aryl group or an alkylthio group, provided that the case of $R_{14}=R_{15}=Cl$ is excluded herein;

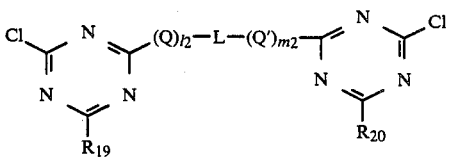

(IV)

wherein $R_{19}$ and $R_{20}$ each represents a chlorine atom, —OM, wherein M represents a hydrogen atom or a monovalent metal atom, an alkyl group or an alkoxy group; Q and Q' each represents —O—, —S—or —NH—; L represents an alkylene group or an arylene group; and $l_2$ and $m_2$ each represents 0 or 1.

DETAILED DESCRIPTION OF THE INVENTION

Hitherto, many researches have been done on the arts of combined use of cyanine dyes which differ in methine chain. Most of such arts are concerned with supersensitizing action which arises by the combined use of spectral sensitizing dyes. Specific examples of supersensitizing combinations of spectral sensitizing dyes are described, e.g., in the above-cited specifications, Japanese Patent Publication No. 1762/73, and Japanese Patent Application (OPI) Nos. 28826/75 and 14313/76, and so on. It is a matter of course that those arts failed in achieving the object of the present invention, that is, preventing a sensitive material of the kind which utilizes a substantially iodide-free silver chlorobromide emulsion from generating fog upon preservation. Moreover, though particular combinations of spectral sensitizing dyes which can contribute to enhancement of keeping stability are described in Japanese Patent Application (OPI) No. 153926/83, even the art of utilizing such combinations can have very little effect upon the object of the present invention.

On the other hand, it has so far been known that keeping quality can be heightened by using a compound represented by the general formula (III) and/or a compound represented by the general formula (IV) as a hardener, and the usage of such compounds are described, e.g., in Japanese Patent Publication No. 6151/72. However, those arts alone cannot produce sufficient effect upon prevention of increase in fog resulting from preservation of a light-sensitive material utilizing a substantially iodide-free silver chlorobromide emulsion. The effect of the present invention can be fully achieved only by hardening a light-sensitive emulsion layer containing silver halide sensitized spectrally by a combined use of the compound of the general formula (I-A), (I-B) or (I-C) and the compound of the general formula (II-A) or (II-B) with the compound of the general formula (III) and/or the compound of the general formula (IV), so this art is a quite novel one.

The combination of the above-described additives does not produce the effect aimed at by the present invention upon silver iodobromide emulsions.

The spectral sensitizing dyes represented by the general formulae (I-A), (I-B) and (I-C) are described in detail below.

$W_1$ and $W_2$ each represents a hydrogen atom or an alkyl group (preferably containing 1 to 6 carbon atoms, with specific examples including a methyl group, an ethyl group, a propyl group, a butyl group, etc.).

$W_1$ is preferably an ethyl or propyl group, and $W_2$ is preferably a hydrogen atom.

$V_1$, $V_2$, $V_3$ and $V_4$ each represents a hydrogen atom, a halogen atom (e.g., a chlorine atom, a bromine atom, etc.), an alkyl group (preferably containing 1 to 8 carbon atoms, with specific examples including a methyl group, an ethyl group, a propyl group, a butyl group, a trifluoromethyl group, etc.), an aryl group (e.g., a phenyl group, etc.), an alkoxy group (preferably containing 1 to 8 carbon atoms, with specific examples including a methoxy group, an ethoxy group, a propoxy group, etc.), an amido group (preferably containing 2 to 8 carbon atoms, with specific examples including an acetamido group, a propionamido group, a benzamido group, etc.), an alkoxycarbonyl group (preferably containing 2 to 8 carbon atoms, with specific examples including a methoxycarbonyl group, an ethoxycarbonyl group, etc.), or a cyano group. $V_1$ and $V_2$, and $V_3$ and $V_4$ may be the same as or different from each other. Further, $V_1$, $V_2$ and $V_3$ each may be a condensed benzene ring.

$V_5$ and $V_6$ may be the same or different, and each has the same meaning as $V_1$, $V_2$, $V_3$ or $V_4$, except for an aryl group and a condensed benzene ring.

Two or more substituent groups represented by $V_1$ to $V_6$ may be present in the same molecule.

Preferred examples of substituent groups represented by $V_1$ to $V_6$ are described below.

When Y represents an oxygen atom, $V_1$ is preferably a phenyl group or a condensed benzene ring, and $V_2$ is preferably a phenyl group, a condensed benzene ring, a chlorine atom or an alkoxy group.

When Y represents a sulfur atom, $V_2$ is preferably a hydrogen atom, a halogen atom, an alkyl group, a phenyl group, an alkoxy group or an amido group.

$V_3$ is preferably a phenyl group, a chlorine atom or a condensed benzene ring, and $V_4$, $V_5$ and $V_6$ each is preferably a trifluoromethyl group, a chlorine atom, an alkoxycarbonyl group or a cyano group. In the general formula (I-C), the case wherein one chlorine atom is attached to every two benzimidazolyl groups, or one-sided benzimidazolyl group is substituted by two chlorine atoms is preferred.

$R_1$, $R_2$, $R_3$, $R_4$, $R_5$, $R_6$, $R_7$, $R_8$ and $R_9$ each represents a substituted or unsubstituted alkyl group (preferably containing not more than 8 carbon atoms, which may have a branched chain or cyclic form, with specific examples including a methyl group, an ethyl group, an n-propyl group, an isopropyl group, a butyl group, an acetylethyl group, a cyclohexyl group, etc.), an alkenyl group (e.g., a vinyl methyl group, etc.) or an aralkyl group (e.g., a benzyl group, a phenethyl group, etc.). More preferred substituent groups represented by them are alkyl groupscontaining 1 to 5 carbon atoms and aralkyl groups containing 7 to 10 carbon atoms.

Two to four of substituent groups represented by the foregoing $R_1$ to $R_9$ are present in each of the general formulae (I-A), (I-B) and (I-C), and at least one of such groups present in the same molecule is preferably an alkyl or aralkyl group substituted with a sulfo group, a sulfonate group, a carboxyl group, a carboxylate group or a hydroxyl group. Specific examples of such substituted alkyl and aralkyl groups as described above include a sulfoethyl group, a sulfopropyl group, a sulfobutyl group, a sulfopropoxyethyl group, a 4-sulfophenylethyl group, a 4-carboxyphenylethyl group, a carboxymethyl group, a carboxyethyl group, a hydroxymethyl group, a hydroxyethyl group, a hydroxypropyl group and the like.

$X_1$, $X_2$ and $X_3$ each represents a counter ion which can suffice for neutralizing the charge of their respective molecules. Suitable examples of cations include a hydrogen ion, a sodium ion, a potassium ion, a triethylammonium ion, a pyridinium ion and so on, and those of anions include a chlorine ion, a bromine ion, an iodine ion and so on.

When the compounds form an inner salt, $l_1$, $m_1$ and $n_1$ respectively are 0, that is, a counter ion is absent therein.

Of the compounds represented by the general formula (I-A), (I-B)or (I-C), the compounds represented by the general formula (I-A) are preferred over others in respect of attainment of the objects of the present invention. In particular, the compounds represented by the general formula (I-A) in which Y represents an oxygen atom are desirable.

Compounds represented by the general formula (II-A) or (II-B) are described in detail below.

$Y_1$ and $Y_2$ in the general formula (II-A) respectively represent atomic groups necessary to constitute a benzoxazole nucleus, a naphthoxazole nucleus, a benzothiazole nucleus, or a naphthothiazole nucleus, each of which may be substituted with a halogen atom such as a fluorine atom, a chlorine atom, a bromine atom, an iodine atom, etc., a hydroxyl group, an alkyl group such as a methyl group, an ethyl group, a propyl group, a butyl group, etc., an alkoxy group such as a methoxy group, an ethoxy group, etc., an aryl group such as a phenyl group, a hydroxyphenyl group, etc., an alkoxycarbonyl group such as a methoxycarbonyl group, an ethoxycarbonyl group, etc., a cyano group, or a nitro group.

$R_{10}$ and $R_{11}$ in the general formula (II-A) have the same meaning as the foregoing $R_1$ to $R_9$.

It is to be desired that at least either $R_{10}$ or $R_{11}$ should be an alkyl or aralkyl group substituted with a sulfo group, a sulfonate group, a carboxyl group, a carboxylate group, or a hydroxyl group.

Specific examples of a counter ion represented by $X_4$ in the general formula (II-A) include the same as those cited as examples of $X_1$ to $X_3$.

$R_{12}$ and $R_{13}$ in the general formula (II-B) respectively represent an alkyl group, an alkenyl group or an aralkyl group, each of which may be substituted with a sulfo group, a sulfonate group, a carboxyl group, a carboxylate group or a hydroxyl group directly or through a divalent alkoxy group, and specific examples thereof include the same as those described with respect to $R_1$ to $R_9$.

Of the foregoing substituent groups, substituted or unsubstituted alkyl groups are preferred as both $R_{12}$ and $R_{13}$.

Specific examples of substituent groups represented by $V_7$ and $V_8$ include the same as those described with respect to $V_1$ to $V_4$, except for a condensed benzene ring.

$V_7$ and $V_8$ may be the same or different, and each is preferably a trifluoromethyl group, a chlorine atom, an alkoxycarbonyl group or a cyano group.

The sensitizing dyes represented by the general formulae (I-A), (I-B) and (I-C) to be employed in the present invention are known compounds, and can be synthesized with ease by reference to the methods described, e.g. in F. M. Hamer, *Heterocyclic Compounds—Cyanine Dyes and Related Compounds,* chapter 5, pages 116–147 (John Wiley and Sons (1964)), D. M. Sturmer, *Heterocyclic Compounds—Special Topics in Heterocyclic Chemistry,* Chapter 8, item 5, pages 482–15 (John Wiley and Sons (1977)), Japanese Patent Publication Nos. 13823/68, 16589/69, 9966/73 and 4936/68, Japanese Patent Application (OPI) No. 82416/77, and so on.

Specific examples of sensitizing dyes represented by the general formulae (I-A), (I-B) and (I-C) to be employed in the present invention are illustrated below, However, the invention is not intended to be construed as being limited to these examples.

(IA-1)

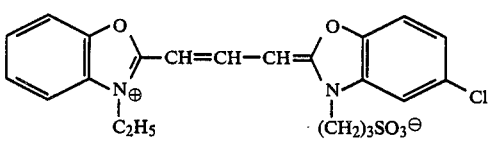

(IA-2)

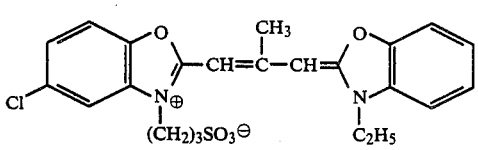

(IA-3)

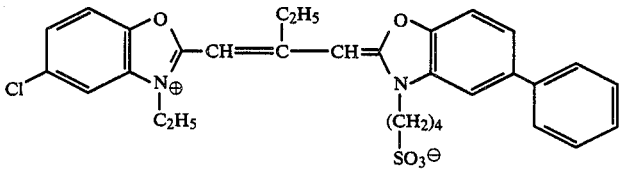

(IA-4)

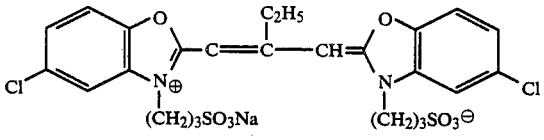

(IA-5)

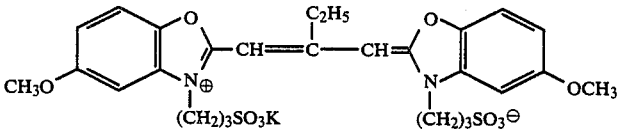

(IA-6)

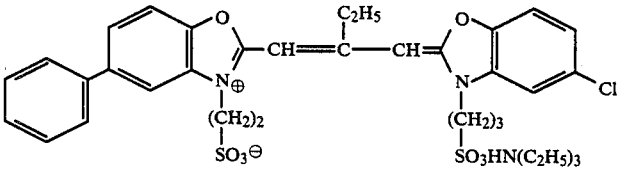

(IA-7)

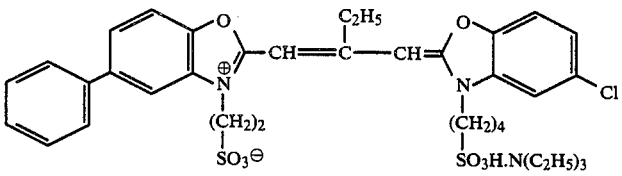

-continued
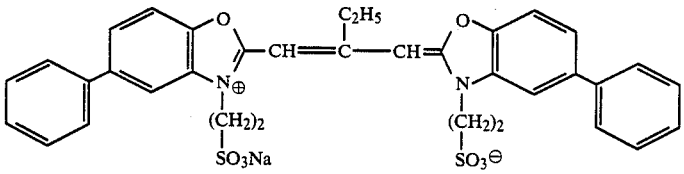
(IA-8)
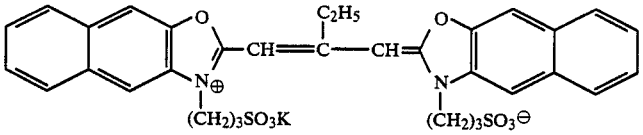
(IA-9)
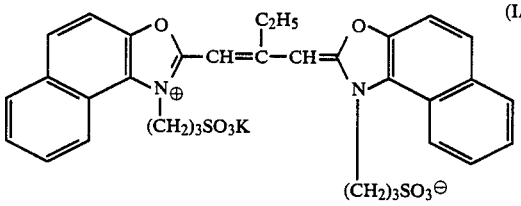
(IA-10)
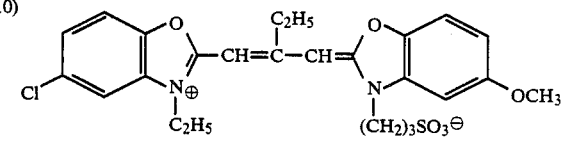
(IA-11)
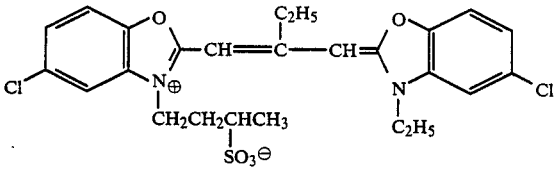
(IA-12)
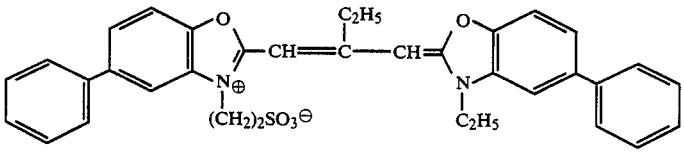
(IA-13)
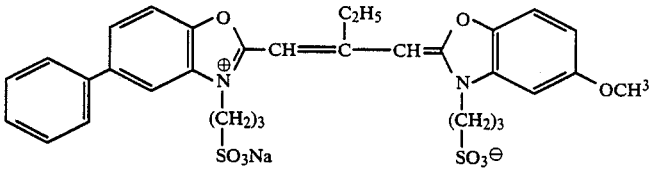
(IA-14)
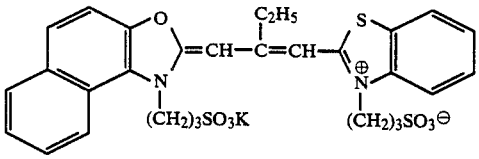
(IA-15)
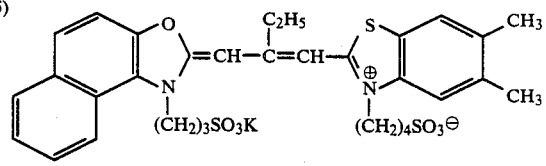
(IA-16)
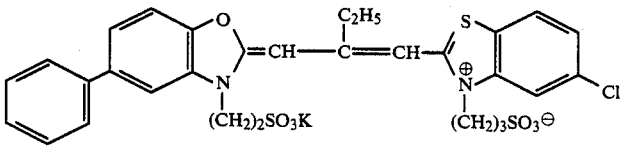
(IA-17)
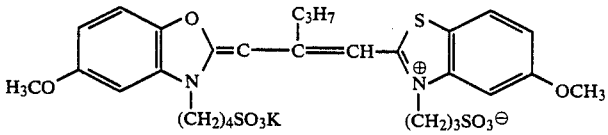
(IA-18)

-continued
(IA-19)
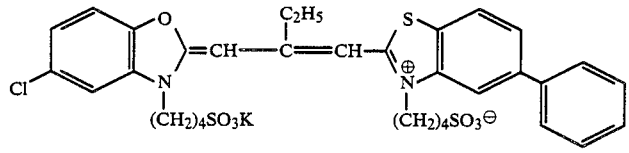
(IA-20)
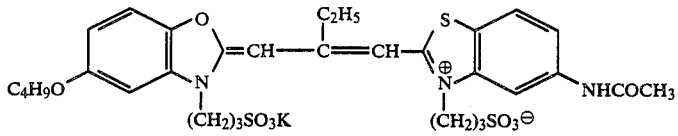
(IA-21)
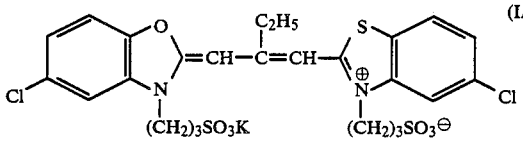
(IA-22)
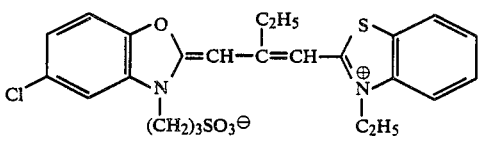
(IA-23)
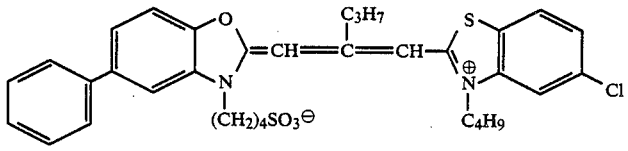
(IA-24)
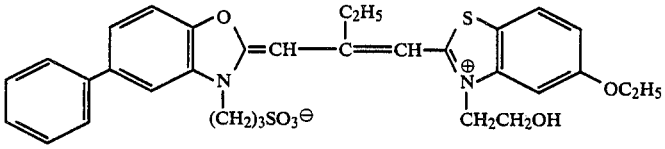
(IB-1)
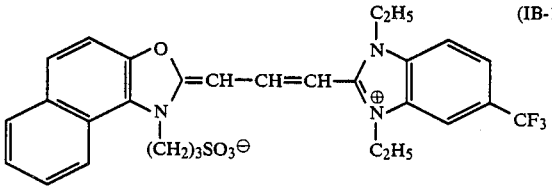
(IB-2)
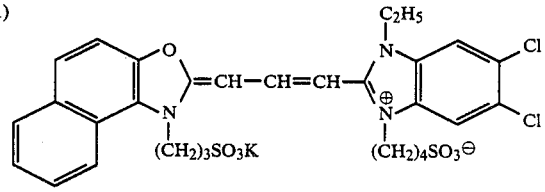
(IB-3)
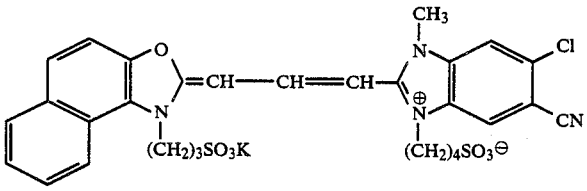
(IB-4)
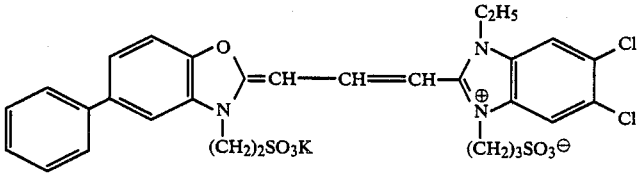
(IB-5)
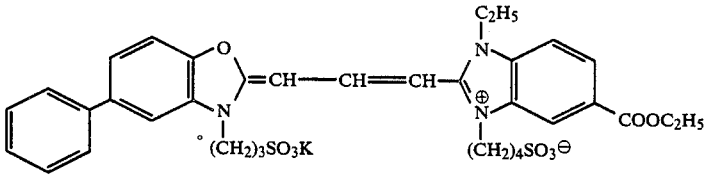

-continued
(IB-6)
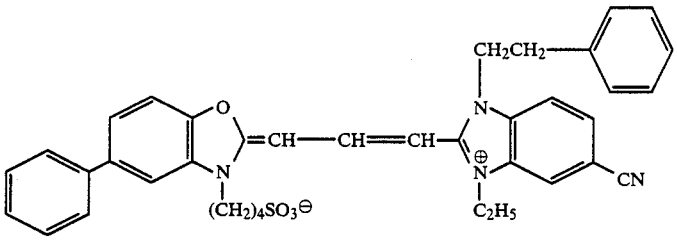
(IB-7)
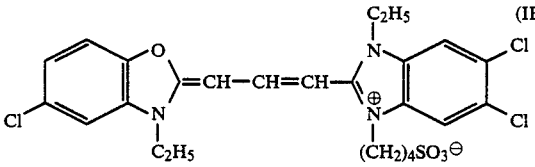
(IB-8)
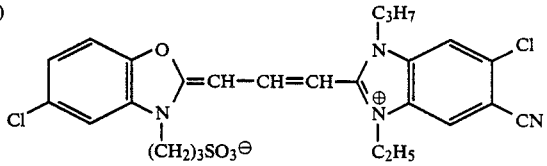
(IB-9)
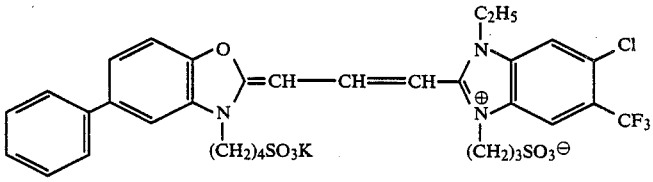
(IC-1)
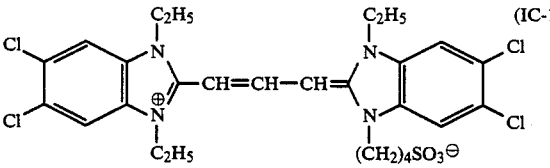
(IC-2)
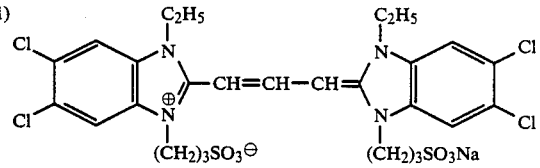
(IC-3)
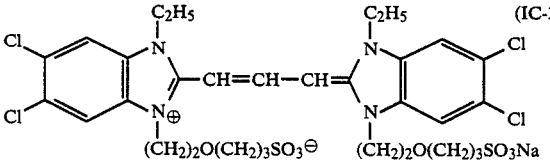
(IC-4)
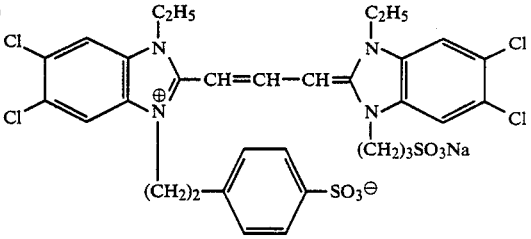
(IC-5)
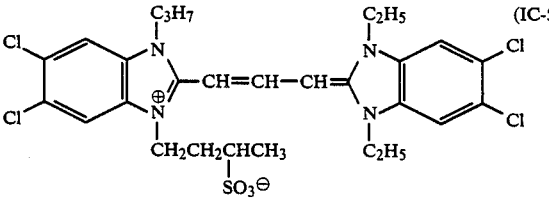
(IC-6)
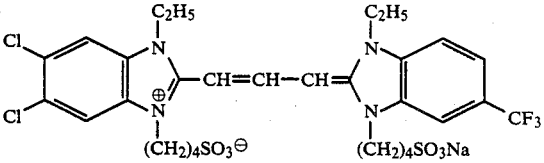
(IC-7)
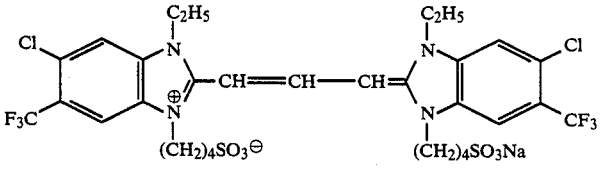
(IC-8)
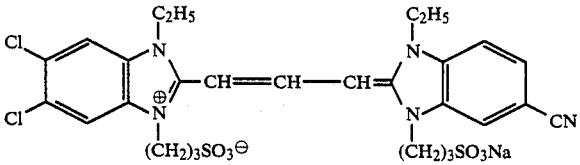

-continued

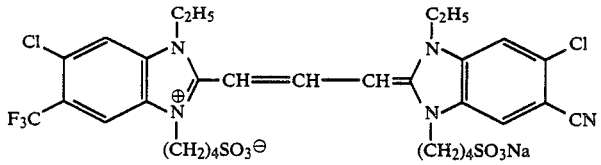

(IC-9)

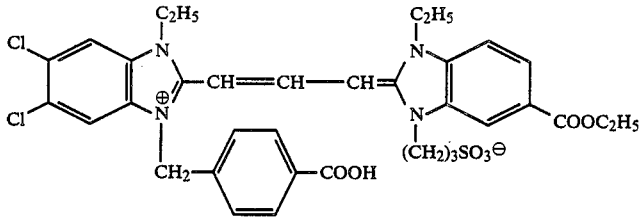

(IC-10)

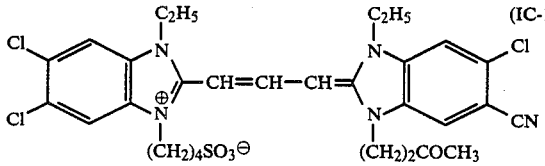

(IC-11)

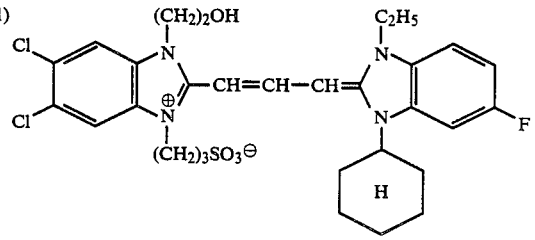

(IC-12)

The sensitizing dyes represented by the general formulae (I-A), (I-B) and (I-C) according to the present invention are incorporated in a silver halide emulsion layer in an amount of from $1\times10^{-6}$ mol to $5\times10^{-3}$ mol, preferably from $1\times10^{31\ 5}$ to $2.5\times10^{-3}$ mol, and more perferably from $4\times10^{-5}$ to $1\times10^{-3}$ mol, per mol of silver halide.

Specific examples of compounds represented by the general formula (II-A) are illustrated below. However, the invention is not intended to be construed as being limited to these examples.

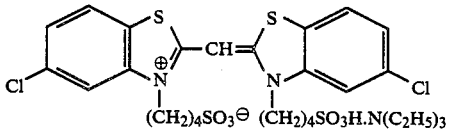

(IIA-1)

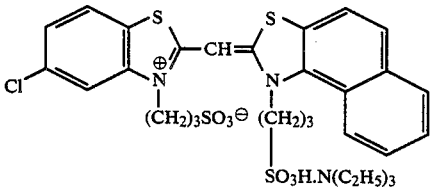

(IIA-2)

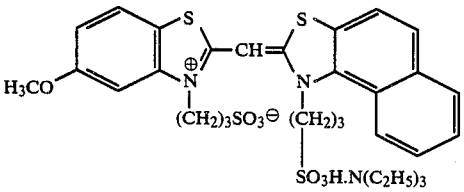

(IIA-3)

-continued

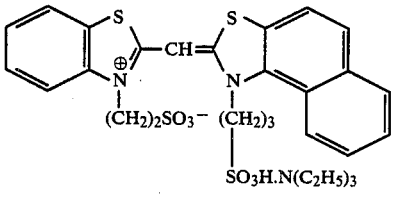

(IIA-4)

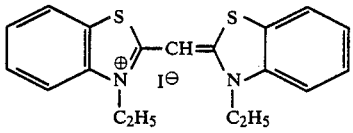

(IIA-5)

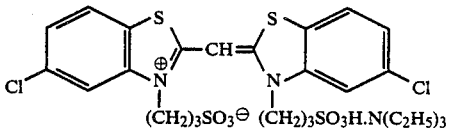

(IIA-6)

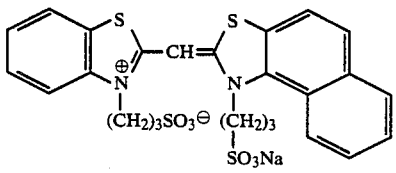

(IIA-7)

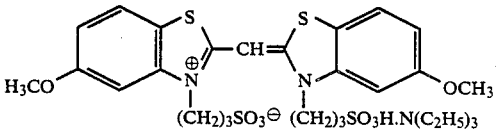

(IIA-8)

-continued
(IIA-9)
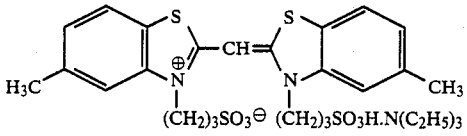
(IIA-10)
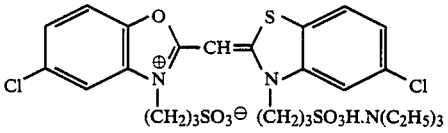
(IIA-11)
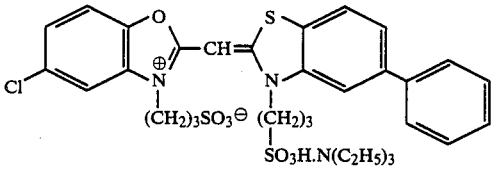
(IIA-12)
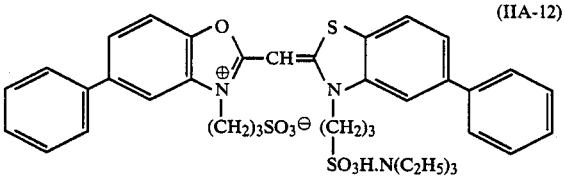
(IIA-13)
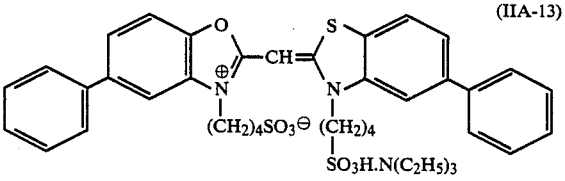
(IIA-14)
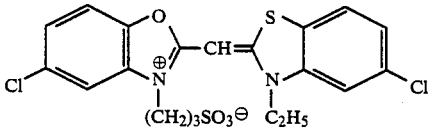
(IIA-15)
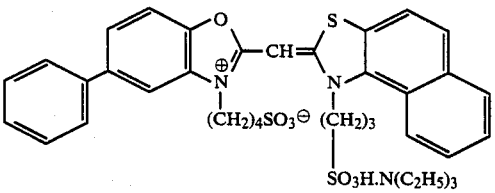
(IIA-16)
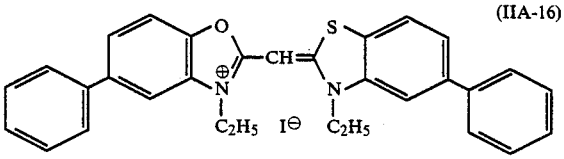
(IIA-17)
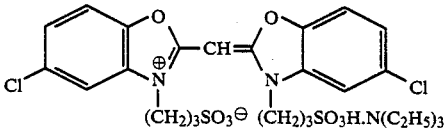
-continued
(IIA-18)
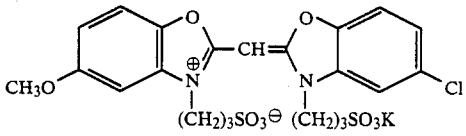
(IIA-19)
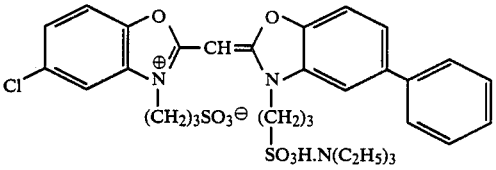
(IIA-20)
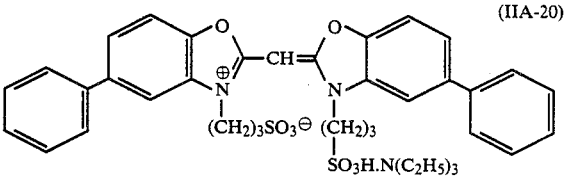
(IIA-21)
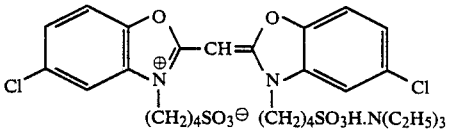
(IIA-22)
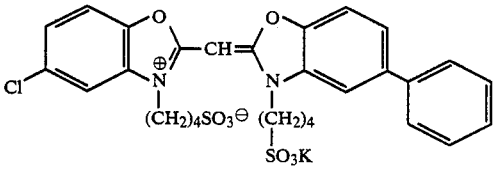
(IIA-23)
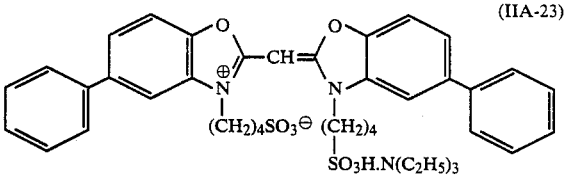
(IIA-24)
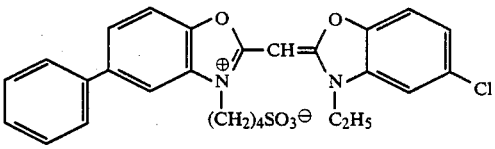
(IIA-25)
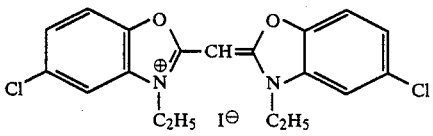
Specific examples of compounds represented by the general formulae (II-B) are illustrated below. However, the invention is not intended to be construed as being limited to these examples.

(IIB-1)

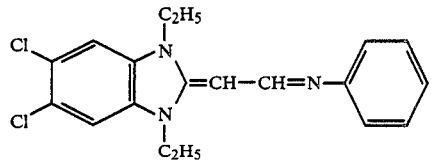

(IIB-2)

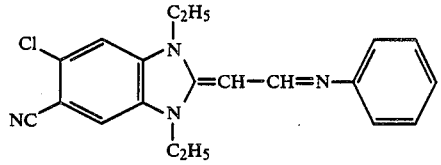

(IIB-3)

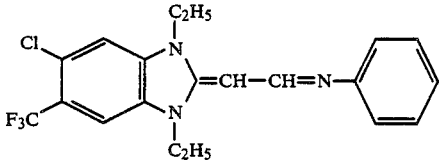

(IIB-4)

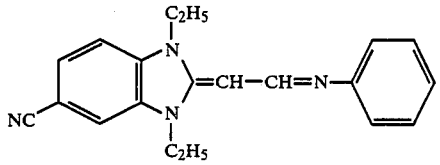

(IIB-5)

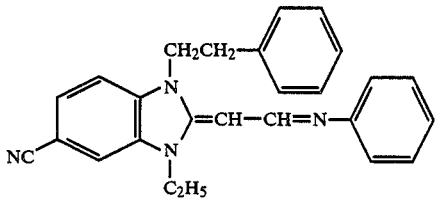

(IIB-6)

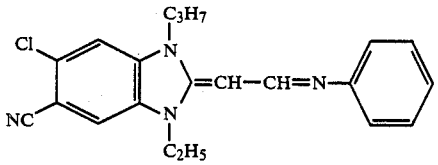

(IIB-7)

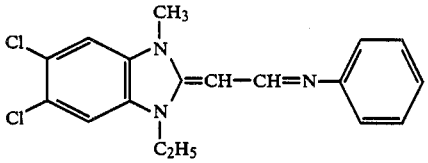

(IIB-8)

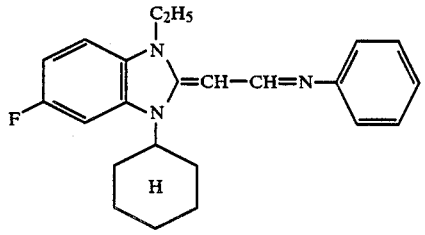

A fraction of the compounds represented by the general formulae (II-A) and (II-B) to be employed in the present invention to the compounds represented by the present formulae (I-A), (I-B) and (I-C) to be employed in combination (to the individual when one compound alone is added, or to the whole when two or more compounds are added as a mixture) ranges preferably from 2 to 70 mol %, particularly preferably from 5 to 50 mol %.

Spectral sensitization of a silver chlorobromide emulsion, which is substantially free of iodide, using the combination of at least one sensitizing dye represented by the general formula (I-A), (I-B) or (I-C) and at least one compound represented by the general formula (II-A) or (II-B) can be effected in a well-known conventional manner. Specifically, the compounds to be employed are dissolved in a proper solvent (e.g., methanol, ethanol, ethyl acetate, etc.) to prepare a solution having an appropriate concentration and then added to a silver halide emulsion.

The solution described above is added to the silver halide emulsion during preparation thereof, or in any process after preparation thereof. For example, it is added during formation of silver halide grains, in the interval between grain formation and chemical ripening, during chemical ripening, after the conclusion of chemical ripening, or at the time of preparation of the coating composition. This solution, a stabilizer and an antifoggant can be added in an arbitrary order.

In order to achieve fully the effect aimed at by the present invention, it is desirable to add the compound of the general formula (I-A), (I-B) or (I-C) (abbreviated as Compound I hereinafter) and the compound of the general formula (II-A) or (II-B) (abbreviated as Compound II hereinafter) at their respective times as described below.

That is, it is to be desired that Compound II should be added simultaneously with or prior to addition of Compound I. In particular, it is advantageous to add it in the form of a solution containing both Compound I and Compound II as a mixture.

Furthermore, in the present invention, compounds which can have a supersensitizing action by the combined use with sensitizing dyes can also be employed in addition to Compound I and Compound II.

The hardeners represented by the general formula (III) are described, e.g., in Japanese Patent Publication Nos. 6151/72 and 33380/72, U.S. Pat. No. 3,645,743, Japanese Patent Application (OPI) Nos. 19220/73, 78788/76, 60612/77, 128130/77, 130326/77 and 1043/81, and those chosen therefrom can be employed in the present invention.

The hardeners represented by the general formula (IV) are described, e.g., in Japanese Patent Publication No. 33542/83 and Japanese Patent Application (OPI) No. 40244/82, and those chosen therefrom can be employed in the present invention.

Of the substituent groups represented by $R_{14}$ and $R_{15}$ in the general formula (III), either $R_{14}$ or $R_{15}$ is preferably a chlorine atom. When a substituent group represented by $R_{14}$ or $R_{15}$ is —OM, preferred M is a sodium atom or a potassium atom. When a substituent group represented by $R_{14}$ or $R_{15}$ is an alkyl group or an alkoxy group, preferred alkyl groups include methyl, ethyl, butyl and the like, and preferred alkoxy groups include methoxy, ethoxy, butoxy and the like. Specific examples of

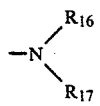

include —$NH_2$, —$NHCH_3$ and so on, and those of —$NHCOR_{18}$ include —$NHCOCH_3$ and so on.

When a substituent group represented by $R_{20}$ or $R_{21}$ in the general formula (IV) is an alkyl group or an alkoxy group, a methyl group, an ethyl group, a butyl group, a methoxy group, an ethoxy group, a butoxy group and the like are preferred. When $R_{19}$ or $R_{20}$ represents —OM, a preferred M is sodium, potassium or like atom. A linkage group represented by L is specifically —$CH_2$—, —$(CH_2)_2$—,

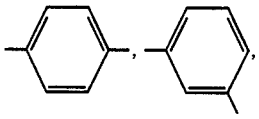

or so on.

The compounds represented by these general formulae (III) and (IV) may be incorporated into the layer containing the silver chlorobromide emulsion which contains substantially no iodide and is spectrally sensitized with a combination of at least one compound selected from those represented by the general formulae (I-A), (I-B) and (I-C) and at least one compound selected from those represented by the general formulae (II-A) and (II-B), or/and into at least one of other layers collectively or dividedly. An amount of the hardener to be added is independent of the kind of the layer in which the hardener is to be added, the gelatin content therein, and so on. However, the hardener is added in a proportion of 0.05 to 15 wt %, preferably 0.2 to 10 wt %, to the total gelatin content in the whole constituent layers Specific examples of the compounds represented by the general formulae (III) and (IV) to be employed in the present invention are illustrated below. However, the present invention is not intended to be construed as being limited to these examples.

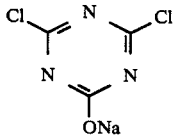

(III-1)

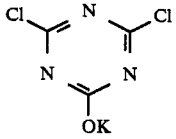

(III-2)

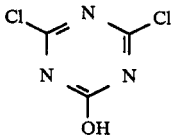

(III-3)

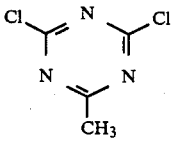

(III-4)

-continued

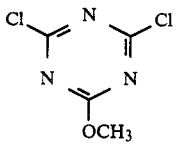

(III-5)

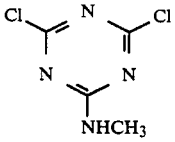

(III-6)

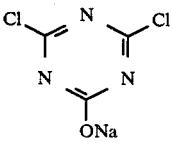

(III-7)

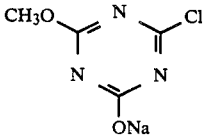

(III-8)

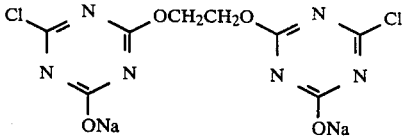

(IV-1)

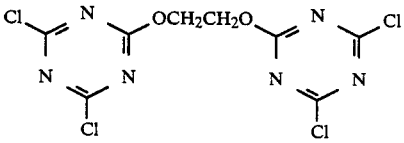

(IV-2)

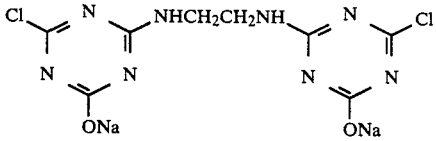

(IV-3)

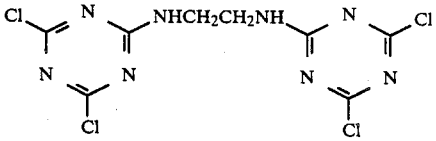

(IV-4)

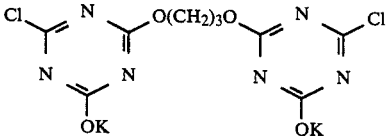

(IV-5)

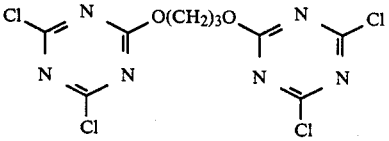

(IV-6)

A magenta dye-forming coupler is added to the light-sensitive emulsion made in accordance with the present invention to prepare a green-sensitive emulsion. This emulsion is combined with a blue-sensitive emulsion containing a yellow dye-forming coupler and a red-sensitive emulsion containing a cyan dye-forming coupler, and coated on a support in a multilayer form to obtain a silver halide color photographic material excellent in keeping quality.

A preferred silver halide to be contained in the light-sensitive emulsion layer according to the present invention is a substantially iodide-free silver chlorobromide having a chloride content of 80 mol % or less and an iodide content of 1 mol % or less. On the other hand, silver halides which can be employed in other light-sensitive emulsion layers include not only silver chloride and silver bromide, but also mixed silver halides. Typical examples of mixed silver halides which can be used therein include silver chlorobromide, silver chloroiodobromide and silver iodobromide. Of these silver halides, silver chloroiodobromide or silver iodobromide having an iodide content of 3 mol % or less, silver chloride and silver chlorobromide are more preferred.

The interior and the surface of silver halide grains which can be employed in the invention may be different, the silver halide grains may have such a multiphase structure as to have conjunction structures, or the silver halide grains may be uniform throughout. The silver halide grains of the above-described kinds may be present as a mixture.

A mean grain size of the silver halide grains employed in the present invention (the grain size as used herein refers to a grain diameter in case of grains spherical or approximately spherical in shape, while it refers to an edge length in case of cubic grains, in both cases, it is represented by the mean based on projected areas of the grains) ranges preferably from 0.1 micron to 2 microns, particularly preferably from 0.15 micron to 1 micron. The distribution of the grain size may be either narrow or broad. However, it is to be desired that a so-called monodispersed silver halide emulsion, which can be defined as a dispersed system in which a value obtained by dividing the standard deviation in the grain size distribution curve of the silver halide emulsion by the mean grain size (a variation rate) is within 15%, particularly preferably within 10%, should be employed in the present invention. In order to satisfy the gradation aimed at by the light-sensitive material, monodispersed silver halide emulsions having substantially the same color sensitivity but differing in grain size (preferably those having a variation rate within the above-described range) can be coated in a single layer as a mixture, or they can be coated separately in a multilayer. Also, two or mone polydispersed silver halide emulsions, or a combination of monodispersed and polydispersed emulsions may be coated as a mixture, or separately in a multilayer.

The silver halide grains to be employed in the present invention may have a regular crystal form, such as that of a cube, an octahedron, a dodecahedron or a tetradecahedron, or an irregular crystal form, such as that of a sphere or so on. Also, the grains may have a composite form of these crystal forms. Moreover, the grains may have a tabular form in which a grain diameter is greater than a grain thickness by a factor of 5 or more, particularly 8 or more. Emulsions which contain such tabular grains as described above in a fraction of 50% or more on a basis of the total projected area of all grains present therein may be employed in this invention. Emulsions which contain silver halide grains having various kinds of crystal forms as a mixture may be employed. These various kinds of emulsions may be either those which form latent image predominantly at the surface of the grains, or those which mainly form latent image inside the grains.

These photographic emulsions can be prepared using various methods as described, e.g., in P. Glafkides, *Chimie et Physique Photographique,* Paul Montel (1967), G. F. Duffin, *Photographic Emulsion Chemistry,* The Focal Press (1966), V. L. Zelikman et al., *Making and Coating Photographic Emulsion,* The Focal Press (1964) and so on. More specifically, any processes, e.g., the acid process, the neutral process, the ammonia process and so on, can be employed.

Suitable methods for reacting a water-soluble silver salt with a water-soluble halide include, e.g., a single jet method, a double jet method or a combination thereof.

Also, a method in which silver halide grains are produced in the presence of excess silver ions (the so-called reverse mixing method) can be employed. Moreover, the so-called controlled double jet method, in which the pAg of the liquid phase in which silver halide grains are to be precipitated is maintained constant, may be employed. According to this method, silver halide emulsions having a regular crystal form and an almost uniform grain size can be obtained.

In a process of producing silver halide grains or allowing the produced silver halide grains to ripen physically, cadmium salts, zinc salts, lead salts, thallium salts, iridium salts or complexes, rhodium salts or complexes, iron salts or complexes and/or the like may be present.

After grain formation, the silver halide emulsions are, in general, ripened physically, desalted, ripened chemically and then coated.

Upon precipitation, physical ripening or chemical ripening, knwon silver halide solvents (such as ammonia, potassium rhodanide, thioethers and thione compounds (e.g., those described in U.S. Pat. No. 3,271,157, Japanese Patent Application (OPI) Nos. 12360/76, 82408/78, 144319/78, 100717/79 and 155828/79), and so on) can be used. Removal of soluble silver salts from the physically ripened emulsions can be achieved according to a noodle washing method, a flocculation method, an ultrafiltration method, or so on.

The silver halide emulsions to be employed in the present invention are chemically sensitized using a sulfur sensitization method which utilizes active gelatin or a sulfur-containing compound capable of reacting with silver ion (e.g., thiosulfates, thioureas, mercapto compounds, rhodamines, etc.), a reduction sensitization method which utilizes a reducing material (e.g., stannous salts, amines, hydrazine derivatives, formamidinesulfinic acid, silane compounds, etc.), a noble metal sensitization method which utilizes a metal compound (e.g., gold complex salts, complex salts of Group VIII metals such as Pt, Ir, Pd, Rh, Fe, etc.) individually or as a combination thereof.

Photographic emulsions employed for layers other than the emulsion layer provided in accordance with the present invention are spectrally sensitized with photographic sensitizing dyes. Suitable dyes which can be used include cyanine dyes, merocyanine dyes, complex cyanine dyes, complex merocyanine dyes, holopolar cyanine dyes, hemicyanine dyes, styryl dyes, and hemioxonol dyes.

These sensitizing dyes may be employed alone or in combination of two or more thereof. In particular, combinations of sensitizing dyes are often employed for the purpose of supersensitization.

Materials which can exhibit a supersensitizing effect in combination with a certain sensitizing dye although they themselves do not spectrally sensitize silver halide emulsions or do not absorb light in the visible region may be incorporated into the silver halide emulsions. For example, aminostilbene compounds substituted with nitrogen-containing heterocyclic groups (e.g., as described in U.S. Pat. Nos.2,933,390 and 3,635,721), aromatic organic aicd-formaldehyde condensates (e.g., as described in U.S. Pat. No. 3,743,510), cadmium salts, azaindene compounds and so on can be used.

Various color couplers can be employed in the present invention. The term "color couplers" used herein describes compounds capable of producing dyes by coupling reaction with oxidation products of aromatic primary amine developing agents. Useful color couplers are cyan, magenta and yellow color-forming couplers. Typical examples of these color couplers include naphthol or phenol compounds, pyrazolone or pyrazoloazole compounds, and open chain or heterocyclic ketomethylene compounds, respectively. Specific examples of these compounds which can be employed in the present invention are described in the patents cited in *Research Disclosure,* RD-17643, VII-D (December, 1978) and *Research Disclosure,* RD-18717 (November, 1979).

Of these couplers, pyrazoloazole type magenta couplers described in detail hereinafter are preferably incorporated in the photographic emulsion sensitized spectrally with the combination of the compound represented by the general formula (I-A), (I-B) or (I-C) and the compound represented by the general formula (II-A) or (II-B) in accordance with the present invention.

It is to be desired that color couplers to be incorporated in the light-sensitive material should be rendered diffusion resistant by having a ballast group or a polymerized form. 2-Equivalent couplers containing a coupling-off group at the coupling active site are preferred to 4-equivalent couplers in which a hydrogen atom is present at the coupling active site from the standpoint of saving a silver coverage. In addition, couplers capable of producing dyes of moderate diffusibility by development, colorless couplers, couplers capable of releasing development inhibitors upon coupling reaction (the so-called DIR couplers), and couplers capable of releasing development accelerators can be used.

As typical examples of yellow couplers which can be employed in the present invention, mention may be made of oil-protected acylacetamide couplers. Specific examples of such couplers are described, e.g., in U.S. Pat. Nos. 2,407,210, 2,875,057 and 3,265,506. The couplers used preferably in the present invention are 2-equivalent ones, and yellow couplers having a coupling-off group containing an oxygen atom as a coupling-off atom described, e.g., in U.S. Pat. Nos. 3,408,194, 3,447,928, 3,933,501 and 4,022,620, and yellow couplers having a coupling-off group containing a nitrogen atom as a coupling-off atom described, e.g., in Japanese Patent Publication No. 10739/83, U.S. Pat. No. 4,401,752 and 4,326,024, *Research Disclosure,* RD-18053 (April, 1979), British Patent No. 1,425,020, German Patent Application (OLS) Nos. 2,219,917, 2,261,361, 2,329,587 and 2,433,812, and so on can be instanced typically. Of these couplers, α-pivaloylacetanilide type couplers have an advantage in that the dyes produced therefrom by development are excellent in fastness, particularly light fastness, while α-benzoylacetanilide type couplers have an advantage in that color density of images produced therefrom is high.

As examples of magenta couplers which can be employed in the present invention, mention may be made of oil-protected indazolone type couplers, cyanoacetyl type couplers, and , more preferably, pyrazoloazole type couplers like 5-pyrazolones, pyrazoloazoles, etc. Of 5pyrazolone type couplers, those substituted with an arylamino group or an acylamino group at the 3-position are preferred over others from the standpoint of the hue and color density of the developed image. Specific examples of such couplers are described in U.S. Pat. Nos. 2,311,082, 2,343,703, 2,600,788, 2,908,573, 3,062,653, 3,152,896 and 3,936,015, and so on. Preferred coupling-off groups of 2-equivalent 5-pyrazolone type couplers include a coupling-off group containing a nitrogen atom as a coupling-off atom described in U.S. Pat. No. 4,310,619, and arylthio groups described in U.S. Pat. No. 4,351,897. Also, 5-pyrazolone type couplers having ballast groups described in European Patent No. 73,636 can provide high color density of the developed image.

As examples of pyrazoloazole type couplers, mention may be made of pyrazolobenzimidazoles described in U.S. Pat. No. 3,369,879, and, more preferably, pyrazolo[5, 1-c][1,2,4]triazoles described in U.S. Pat. No. 3,725,067, pyrazolotetrazoles described in *Research Disclosure,* RD-24220 (June, 1984), and pyrazolopyrazoles described in *Research Disclosure,* RD-24230 (June, 1984). Of these couplers, imidazo[1,2-b]pyrazoles described in European Patent No. 119,741, and, more particularly, pyrazolo[1,2-b][1,2,4]triazoles described in European Patent No. 119,860 are preferred over others from the viewpoint that dyes produced therefrom by development have slight side absorption in the yellow region and excellent fastness to light.

Cyan couplers which can be used in the present invention include oil-protected couplers of naphthol and phenol types. Representatives of preferred naphthol type couplers are those described in U.S. Pat. No. 2,474,293, especially 2-equivalent naphthol couplers having a coupling-off group containing an oxygen atom as a coupling-off atom described in U.S. Pat. Nos. 4,052,212, 4,146,396, 4,228,233 and 4,296,200. Specific examples of phenol type couplers are described, e.g., in U.S. Pat. Nos. 2,369,929, 2,801,171, 2,772,162, 2,895,826 and so on. Particularly preferred cyan couplers in the present invention are those excellent in humidity and temperature resistances. As typical examples of such couplers, mention may be made of phenol type cyan couplers having an alkyl group higher than ethyl group at an m-position of the phenol nucleus, which are described in U.S. Pat. No. 3,772,162, the phenol type couplers having acylamino groups at both 2- and 5-positions, which are described, e.g., in U.S. Pat. Nos. 2,772,162, 3,758,308, 4,126,396, 4,334,011 and 4,327,173, German Patent Application (OLS) No. 3,329,729, Japanese Patent Application (OPI) No. 166956/84, and so on, and the phenol type couplers having a phenylureido group at the 2-position and an acylamino group at the 5-position, which are described in U.S. Pat. Nos. 3,446,622, 4,333,999, 4,451,559 and 4,427,767, and so on.

Granularity of images can be improved by the combined use with couplers which can produce dyes having moderate diffusibility by development. Specific examples of diffusible dye-producing magenta couplers are described in U.S. Pat. No. 4,366,237 and British Patent No. 2,125,570 and those of diffusible dye-producing yellow, magenta and cyan couplers are described in European Patent No. 96,570 and German Patent Application (OLS) No. 3,234,533.

The dye-forming couplers and the above-described special couplers may take a polymeric form (including a dimeric form and higher ones). Typical examples of polymerized dye-forming couplers are described in U.S. Pat. Nos. 3,451,820 and 4,080,211. Typical examples of polymerized magenta couplers are described in British Patent No. 2,102,173 and U.S. Pat. No. 4,367,282.

In order to satisfy the characteristics required of the light-sensitive material, two or more of various couplers to be employed in the present invention can be incorporated together into the same light-sensitive layer, or the same coupler can be introduced into two or more of different kinds of layers.

Couplers to be employed in the present invention can be introduced into the light-sensitive material using various known methods of dispersing. For instance, the dispersion can be effected by a solid dispersion method, a caustic dispersion method, preferably a latex dispersion method, and more preferably an oil-in-water dispersion method. In the oil-in-water dispersion method, couplers are dissolved in either a high boiling organic solvent having a boiling point of 175° C. or above or a so-called auxiliary solvent having a low boiling point, or in a mixture of these solvents and then dispersed finely into an aqueous medium like water or an aqueous gelatin solution in the presenc of a surface active agent. Suitable examples of high boiling organic solvents are described in U.S. Pat. No. 2,322,027, and so on. The dispersion may be accompanied by phase inversion. Further, the auxiliary solvent used may be removed from the dispersion or decreased in content therein through distillation, noodle washing, ultrafiltration or so on, if needed, in preference to coating of the dispersion.

Specific examples of high boiling organic solvents which can be used include phthalic acid esters (e.g., dibutyl phthalate, dicyclohexyl phthalate, di-2-ethylhexyl phthalate, decyl phthalate, etc.), phosphoric or phosphonic acid esters (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphate, etc.), benzoic acid esters (e.g., 2-ethylhexyl benzoate, dodecylbenzoate, 2-ethylhexyl-p-hydroxybenzoate, etc.), amides (e.g., diethyldodecanamide, N-tetradecylpyrrolidone, etc.), alcohols and phenols (e.g., isostearyl alcohol, 2,4-di-tert-amylphenol, etc.), aliphatic carboxylic acid esters (e.g., azelaic acid dioctyl ester, glycerol tributyrate, isostearyl lactate, trioctyl citrate, etc.), aniline derivatives (e.g., N,N- dibutyl-2-butoxy-5-tert-octylaniline, etc.), hydrocarbons (e.g., paraffins, dodecylbenzene,diisopropylnaphthalene, etc.), and so on. As for the auxiliary solvents, organic solvents having a boiling point of from about 30° C., preferably 50° C., to about 160° C. can be used, with typical examples including ethyl acetate, butyl acetate, ethyl propionate, methyl ethyl ketone, cyclohexane, 2ethoxyethyl acetate, dimethylformamide, and so on.

Processes and effects of the latex dispersion method, and specific examples of latexes employed as impregnant are described in U.S. Pat. No. 4,199,363, German Patent Application (OLS) Nos. 2,541,274 and 2,541,230, and so on.

A standard amount of color couplers used ranges from 0.001 to 1 mol per mol of light-sensitive silver halide. More specifically, it is preferable to use a yellow coupler in an amount of 0.01 to 0.5 mol, a magenta coupler in an amount of 0.003 to 0.3 mol, and a cyan coupler in an amount of 0.002 to 0.3 mol.

The light-sensitive material produced in accordance with the present invention may contain, as a color fog inhibitor or a color mixing inhibitor, hydroquinone derivatives, aminophenol derivatives, amines, gallic acid derivatives, catechol derivatives, ascorbic acid derivatives, colorless couplers, sulfonamidophenol derivatives, or so on.

The light-sensitive material of the present invention can contain known discoloration inhibitors. The representatives of the organic discoloration inhibitors are hydroquinones, 6-hydroxychromanes, 5hydroxycoumarans, spirochromanes, p-alkoxyphenols, hindered phenols including bisphenols as main members, gallic acid derivatives, methylenedioxybenzenes, aminophenols, hindered amines, and ether or ester derivatives obtained by silylating or alkylating a phenolic hydroxyl group of the above-cited compounds each. In addition, metal complex salts represented by (bissalicylaldoximato)-nickel complexes and (bis-N,N-dialkyldithiocarbamato)nickel complexes can also be employed as discoloration inhibitor.

On the prevention of deterioration of yellow dye images due to heat, moisture and light, compounds having both hindered amine and hindered phenol moieties in a molecule can produce a desirable effect, as described in U.S. Pat. No. 4,268,593. In order to prevent magenta dye images from suffering deterioration, particularly due to light, spiroindanes described in Japanese Patent Application (OPI) No. 159644/81, and chromanes substituted with a hydroquinone di- or monoether described in Japanese Patent Application (OPI) No. 89835/80 are employed to advantage.

The light-sensitive material of the present invention can contain an ultraviolet absorbing agent in a hydrophilic colloidal layer thereof.

The light-sensitive material of the present invention may further contain water-soluble dyes in a hydrophilic colloidal layer thereof as a filter dye, or for various purposes, e.g., prevention of irradiation, antihalation, and so on.

The light-sensitive material of the present invention may contain a whitening agent of stilbene type, triazine type, oxazole type, coumarin type or the like in a photographic emulsion layer or some other hydrophilic colloidal layer thereof. A whitening agent to be used may be water-soluble one, or a water-insoluble whitening agent may be used in a form of dispersion.

Gelatins are used to advantage as binder or protective colloid to be contained in emulsion layers and interlayers of the light-sensitive material of the present invention. Also, hydrophilic colloids other than gelatin can be used.

Specific examples of gelatins include not only generally used lime-processed gelatin, but also acid-processed gelatin, enzyme-processed gelatin as described in *Bull. Soc. Sci. Phot. Japan,* No. 16, p. 30 (1966), hydrolysis products of gelatin and enzyme decomposition products of gelatin.

In addition to the foregoing additives, the light-sensitive material of the present invention may contain various stabilizers, stain inhibitors, developers or precursors thereof, development accelerators or precursors thereof, lubricants, mordants, matting agents, antistatic agents, plasticizers, or other various additives useful for a photographic light-sensitive material. Typical examples of such additives are described in *Research Disclosure,* RD-17643 (December, 1978), and *Research Disclosure,* RD-18716 (November, 1979).

The present invention can be applied to a multilayer multicolor photographic material having at least two different color sensitivities on a support, as described hereinbefore. A multilayer color photographic material has, in general, at least one red-sensitive emulsion layer, at least one green-sensitive emulsion layer and at least one blue-sensitive emulsion layer on a support. The order of these layers can be varied as desired. Each of the above-described emulsion layers may have two or more constituent layers differing in sensitivity, and a light-insensitive layer may be arranged between any two of the constituent layers having the same color sensitivity.

In addition to the above-described silver halide emulsion layers, it is desired to provide proper auxiliary layers, such as a protective layer, an interlayer, a filter layer, an antihalation layer, a backing layer and so on, in the light-sensitive material according to the present invention.

In the photographic light-sensitive material of the present invention, photographic emulsion layers and other layers are coated on a conventionally used flexible support, such as a plastic film, paper, cloth or the like, or a rigid support such as glass, ceramics, metals or so on.

The present invention can be applied to various kinds of color photographic materials. The representatives of color photographic materials to which the present invention can be applied are color paper, color positive films, color negative films, color reversal films for slide use, motion picture use or television use, and so on. In particular, the present invention can fully achieve its effects when applied to color paper of which it is required to have excellent color reproducibility, to provide dye images of satisfactory fastness, and to be stable during development processing.

A color developing solution to be used for development processing of the photographic material of the present invention is an alkaline aqueous solution containing preferably an aromatic primary amine type color developing agent as a main component. Preferred developing agents of such a type are p-phenylenediamine compounds. The representatives of such compounds include 3-methyl-4-amino-N,N-diethylaniline, 3-methyl-4- amino-N-ethyl-N-$\beta$-hydroxyethylaniline, 3-methyl-4-amino- N-ethyl-N-$\beta$-methanesulfonamidoethylaniline, 3-methyl-4- amino-N-ethyl-N-$\beta$-methoxyethylaniline, and sulfates, hydrochloride or p-toluenesulfonates of the above-cited anilines.

The color developing solution can generally contain pH buffering agents such as carbonates, borates or phosphates of alkali metals, and development inhibitors or antifoggants such as bromides, iodides, benzimidazoles, benzothiazoles or mercapto compounds.

After color development, the photographic emulsion layers of the present invention are subjected to bleach processing. The bleach processing may be carried out simultaneously with fix-processing or separately therefrom.

Suitable examples of bleaching agents which can be used include compounds of polyvalent metals, such as Fe(III), Co(III), Cr(VI), Cu(II), etc., peroxy acids, quinones, nitroso compounds and so on. Representatives of such bleaching agents are ferricyanides; bichromates; complex salts of Fe(III) or Co(III) and organic acids such as ethylenediaminetetraacetic acid, diethylenetriaminepentaacetic acid, nitrilotriacetic acid, 1,3- diamino-2-propanoltetraacetic acid and other aminopolycarboxylic acids, citric acid, tartaric acid and malic acid; persulfates; manganese; nitrosophenol; and so on. Of these complex salts, ethylenediaminetetraacetatoferrate(III) complex salts and persulfates are preferred from the standpoints of ensuring rapid processing and mitigating circumstance pollution. Further, ethylenediaminetetraacetatoferrate(III) complex salts are particularly useful in not only an independent bleach bath, but also a combined bleach and fix bath.

To a bleach-fix bath may be added various accelerators in combination, if desired.

After bleach-fix processing or fix processing, a washing processing is generally carried out. In the step of washing, addition of various known compounds may be carried out for purposes of preventing precipitation and saving washing water. In order to prevent the precipitation from occurring, a water softener such as an inorganic phosphoric acid, an aminopolycarboxylic acid, an organic phosphonic acid, or so on; a germicide and a bactericide for inhibiting various bacteria, waterweeds and molds from breaking out; a hardener represented by a magnesium salt or an aluminum salt; a surface active agent for lightening drying load and preventing drying mark from generating; and so on can be added, if needed. Also, the compounds described in L. E. West, *Photo. Sci. Eng.,* Vol. 6, pp. 344–359 (1965) may be added. In particular, addition of chelating agents and bactericides is effective.

The washing step is, in general, carried out using two or more tanks according to the countercurrent washing method for the purpose of saving water. On the other hand, a multistage countercurrent stabilization processing step as described in Japanese Patent Application (OPI) No. 8543/82 may be carried out in place of the washing step. To the stabilizing bath are added various kinds of compounds in order to stabilize the developed images. As typical examples of such additives, mention may be made of various buffering agents for adjusting pH to a proper value (ranging generally from 3 to 8), such as those obtained by combining properly acids and alkalis selected from among borates, metaborates, borax, phosphates, carbonates, potassium hydroxide, sodium hydroxide, aqueous ammonia, monocarboxylic acids, dicarboxylic acids, polycarboxylic acids and the like, and formaldehyde. The stabilizing bath may further contain a water softener (e.g., inorganic phosphoric acids, aminopolycarboxylic acids, organic phosphonic acids, aminopolyphosphonic acids, phosphocarboxylic acids, or so on), a germicide (e.g., benzisothiazolinone, isothiazolone, 4-thiazolinebenzimidazole, halogenophenols, or so on), a surface active agent, a brightening agent, a hardener and other various kinds of additives, if desired. Two or more kinds of compounds may be used for the same purpose or different ones.

In addition, it is desired that various ammonium salts, such as ammonium chloride, ammonium nitrate, ammonium sulfate, ammonium phosphate, ammonium sulfite, ammonium thiosulfate and the like, should be added to the stabilizing bath in order to control the pH in the processed film.

A color developing agent may be incorporated into the silver halide color photographic material of the present invention for purposes of similifying and quickening the photographic processing. Incorporation of the color developing agent is carried out to advantage by using it in the form of precursor.

Further, various 1-phenyl-3-pyrazolidones may optionally be incorporated in the silver halide color photographic material of the present invention for the purpose of accelerating the color development. Representatives of such pyrazolidones are described in Japanese Patent Application (OPI) Nos. 64339/81, 144547/82, 211147/82, 50532/83, 50536/83, 50533/83, 50534/83, 50535/83 and 115438/83, and so on.

Each processing solution is used at a temperature of from 10° C. to 50° C. in the present invention. Although standard temperatures are within the range of 33° C. to 38° C., temperatures higher than the abovedescribed upper limit may be employed for accelerating the processing to reduce the processing time, while improvement in image quality and enhancement of stabilities of processing solutions can be achieved under lower temperatures. In addition, intensification utilizing a cobalt compound or hydrogen peroxide, which is described in German Patent No. 2,226,770 or U.S. Pat. No. 3,674,499, may be carried out for the purpose of saving silver in a light-sensitive material.

Each processing bath may be equipped with a heater, a temperature sensor, a liquid level sensor, a circular pump, a filter, a floating lid, a squeegee or so on, if needed.

The present invention is described in detail with reference to the following examples, but the present invention is not to be construed as being limited thereto. Unless otherwise indicated herein, all parts, percents, ratios and the like are by weight.

EXAMPLE 1

Emulsions 1 to 3 were prepared in the following manner using a silver chlorobromide emulsion (chloride content: 30 mol %) which comprises monodispersed cubic grains having a mean grain size of 0.4 micron. Therein, the compounds set forth in Table 1 were used as spectral sensitizing dyes, and chemical sensitization was carried out by addition of sodium thiosulfate in an amount of 2.0—$10^{-5}$ mol per mol of silver halide. Further, 4-hydroxy-6-methyl(1,3,3a,7)tetraazaindene was added as stabilizer in an amount of 300 mg per mol of silver halide.

TABLE 1

| Emulsion | Spectral Sensitizing Dye | Amount Added per Mol of Silver Halide |
|---|---|---|
| Emulsion 1 | (IA-6) | 250 mg |
| Emulsion 2 | (IA-6)/(IIA-23) | 250 mg/50 mg |
| Emulsion 3 | (IA-6)/(IIB-1) | 250 mg/25 mg |

Then, 100 g of the magenta coupler (*a) was dissolved together with 30 g of the discoloration inhibitor (*b) and 20 g of the discoloration inhibitor (*c) into a mixed solvent constituted with 90 ml of the solvent (*d), 60 ml of the solvent (*e) and 150 ml of ethyl acetate. The solution was emulsified and dispersed into 1,200 g of a 10% aqueous solution of gelatin containing 4.0 g of sodium dodecylbenzenesulfonate to prepare an emulsified dispersion 1.

Separately, 100 g of the magenta coupler (*f) was dissolved together with 50 g of the discoloration inhibitor (*b) into a mixed solvent constituted with 200 ml of the solvent (*d) and 100 ml of ethyl acetate. The solution was emulsified and dispersed into 2,000 g of a 10% aqueous solution of gelatin containing 8.0 g of sodium dodecylbenzenesulfonate to prepare an emulsified dispersion 2.

The compound (*a) to (*f) used are illustrated below.

(*a) Magenta Coupler

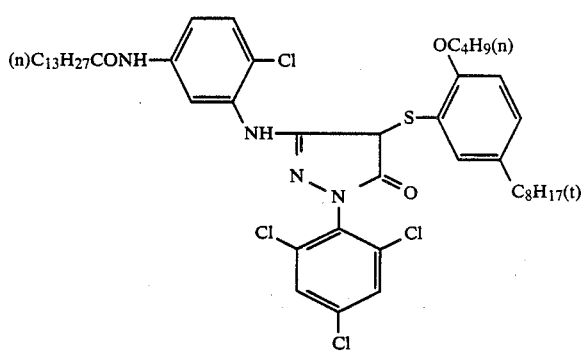

(*b) Discoloration Inhibitor

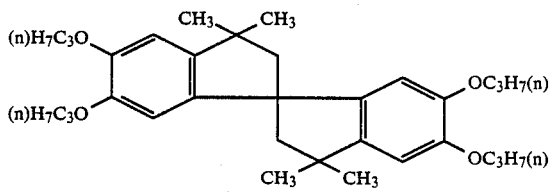

(*c) Discoloration Inhibitor

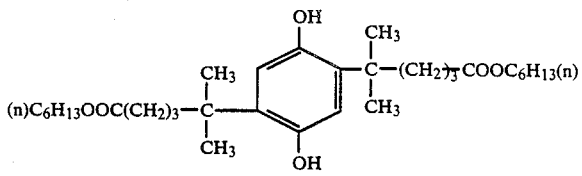

(*d) Solvent $(C_8H_{17}O)_3P{=}O$

-continued (*e) Solvent

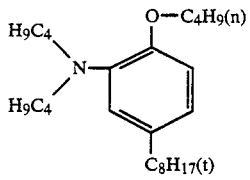

(*f) Magenta Coupler

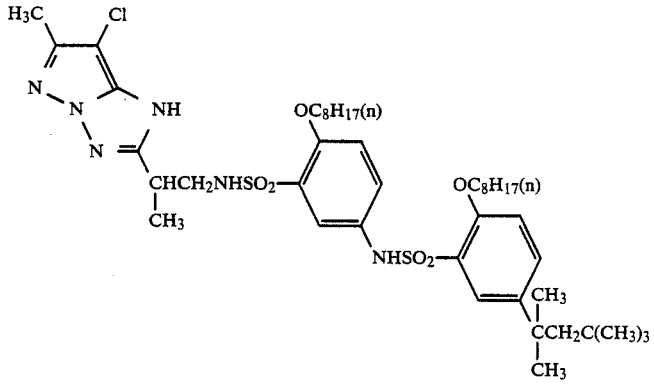

Coating compositions were prepared using the thus obtained emulsions 1 to 3 and emulsified dispersions 1 and 2 in various combinations, and each was coated on a sheet of paper laminated with polyethylene on the both sides together with a protective layer. Thus, 12 kinds of samples having compositions shown in Table 2 were obtained. The polyethylene laminate on the side where the emulsion layer and the protective layer were present contained titanium dioxide and a slight amount of ultramarine.

*g in Table 2 was a hardener employed for comparison, and represented by the formula:

$H_2C[(CH_2)_2SO_3CH{=}CH_2]_2$.

| Processing Step | Temperature (°C.) | Time (min) |
|---|---|---|
| Development | 33 | 3.5 |
| Bleach-Fix | 33 | 1.5 |
| Washing | 28–35 | 3.0 |

| Composition of Developing Solution: | |
|---|---|
| Diethylenetriaminepentaacetic Acid | 1.0 g |
| Benzyl Alcohol | 15 ml |
| Diethylene Glycol | 10 ml |
| $Na_2SO_3$ | 2.0 g |

TABLE 2

| Sample No. | Support | Green-Sensitive Emulsion Layer: Emulsion (silver coverage 200 mg/m²) | Emulsified Dispersion | | Hardener | Protective Layer | Remarks |
|---|---|---|---|---|---|---|---|
| 1 | Paper laminated with polyethylene on both sides. | Emulsion 1 | Emulsified Dispersion 1 | | (III-1) 45 mg/m² | Gelatin coverage: 1,500 mg/m² | Comparison |
| 2 | | Emulsion 2 | Magenta coupler (*a) | 300 mg/m² | | | Invention |
| 3 | | Emulsion 3 | Discoloration inhibitor (*b/*c) | 90/60 mg/m² | | | Invention |
| 4 | | Emulsion 1 | Coupler solvent (*d/*e) | 0.45 ml/m² | *g 70 mg/m² | | Comparison |
| 5 | | Emulsion 2 | Gelatin | 1,300 mg/m² | | | Comparison |
| 6 | | Emulsion 3 | | | | | Comparison |
| 7 | | Emulsion 1 | Emulsified Dispersion 2 | | (III-1) 53 mg/m² | | Comparison |
| 8 | | Emulsion 2 | Magenta coupler (*f) | 600 mg/m² | | | Invention |
| 9 | | Emulsion 3 | Discoloration inhibitor (*b) | 300 mg/m² | | | Invention |
| 10 | | Emulsion 1 | Coupler solvent (*d) | 1.20 ml/m² | *g 82 mg/m² | | Comparison |
| 11 | | Emulsion 2 | | | | | Comparison |
| 12 | | Emulsion 3 | Gelatin | 1,800 mg/m² | | | Comparison |

In order to evaluate the keeping quality, these samples were submitted to a forced deterioration test that they were allowed to stand for 4 weeks under a temperature of 50° C. and a relative humidity of 45% and then changes in photographic properties were examined. Before and after the storage, each sample was subjected to gradation exposure for sensitometry using an enlarger (Fuji Color Head 690, product of Fuji Photo Film Co., Ltd.) through a green filter and then to development processing including the following steps.

| | |
|---|---|
| KBr | 0.5 g |
| Hydroxylamine Sulfate | 3.0 g |
| 4-Amino-3-methyl-N—ethyl-N—[β-(methanesulfonamido)ethyl]-p-phenylenediamine Sulfate | 5.0 g |
| $Na_2CO_3$ (monohydrate) | 30 g |
| Water to make | 1 liter |
| | pH 10.1 |

| Composition of Bleach-Fix Bath: | |
|---|---|
| Ammonium Thiosulfate (54 wt %) | 150 ml |
| $Na_2SO_3$ | 15 g |
| $NH_4[Fe(EDTA)]$ | 55 g |

-continued

| | |
|---|---|
| EDTA 2.2 Na | 4 g |
| Water to make | 1 liter |
| | pH 6.9 |

Color densities of the samples processed were measured, and change in sensitivity which had been caused by storage under the foregoing condition was determined. In addition, fog density of each sample was measured. The results obtained are shown in Table 3. (As for the sensitivity, the sensitivity of each sample determined before storage was taken as 100.

TABLE 3

| | Before Storage | | After Storage | | |
|---|---|---|---|---|---|
| Sample No. | Sensitivity | Fog Density | Sensitivity | Fog Density | Remarks |
| 1 | 100 | 0.05 | 93 | 0.13 | Comparison |
| 2 | 100 | 0.06 | 94 | 0.07 | Invention |
| 3 | 100 | 0.05 | 95 | 0.08 | Invention |
| 4 | 100 | 0.06 | 115 | 0.21 | Comparison |
| 5 | 100 | 0.06 | 118 | 0.18 | Comparison |
| 6 | 100 | 0.05 | 116 | 0.19 | Comparison |
| 7 | 100 | 0.06 | 94 | 0.15 | Comparison |
| 8 | 100 | 0.05 | 96 | 0.06 | Invention |
| 9 | 100 | 0.05 | 95 | 0.07 | Invention |
| 10 | 100 | 0.07 | 119 | 0.23 | Comparison |
| 11 | 100 | 0.08 | 117 | 0.20 | Comparison |
| 12 | 100 | 0.07 | 115 | 0.22 | Comparison |

As can be seen from the foregoing data, the present invention showed a marked inhibition for increase in fog which had so far been caused by storage in a state of finished goods.

EXAMPLE 2

On a paper support laminated with polyethylene on the both sides were coated constituent layers from the first to the seventh ones described below to prepare a color photographic material. The polyethylene laminate on which the first layer was coated contained titanium dioxide and a slight amount of ultramarine.

The number corresponding to each ingredient in the following description represents a coverage expressed in g/m$^2$. As for the silver halide emulsions, their coverages are based on silver.

First Layer: Blue-Sensitive Layer

| | |
|---|---|
| Mixed silver chlorobromide as described in Table 7 below | 0.30 (silver) |
| Yellow coupler (*h) | 0.70 |
| Coupler solvent (*i) for the above | 0.15 |
| Gelatin | 0.20 |

-continued

Second Layer: Interlayer

| | |
|---|---|
| Gelatin | 0.90 |
| Di-t-octylhydroquinone | 0.05 |
| Coupler solvent (*j) for the above | 0.10 |

Third Layer: Green-Sensitive Layer

See Tables 4 to 7

Fourth Layer: Ultraviolet Absorbing Interlayer

| | |
|---|---|
| Ultraviolet absorbent (*k/*l/*m) | 0.06/0.25/0.25 |
| Coupler solvent (*i) for the above | 0.20 |
| Gelatin | 1.5 |

Fifth Layer: Red-Sensitive Layer

| | |
|---|---|
| Mixed silver chlorobromide as described in Table 7 below | 0.20 (silver) |
| Cyan coupler (*n/*o) | 0.2/0.2 |
| Coupler solvent (*i/*j) for the above | 0.10/0.20 |
| Gelatin | 0.9 |

Sixth Layer: Ultraviolet Absorbing Interlayer

| | |
|---|---|
| Ultraviolet absorbent (*k/*l/*m) | 0.06/0.25/0.25 |
| Coupler solvent (*j) for the above | 0.20 |
| Gelatin | 1.5 |

Seventh Layer: Protective Layer

| | |
|---|---|
| Hardener (see Table 5) | |
| Gelatin | 1.5 |

The compounds (*h) to (*o) are illustrated below.

(*h) Yellow Coupler

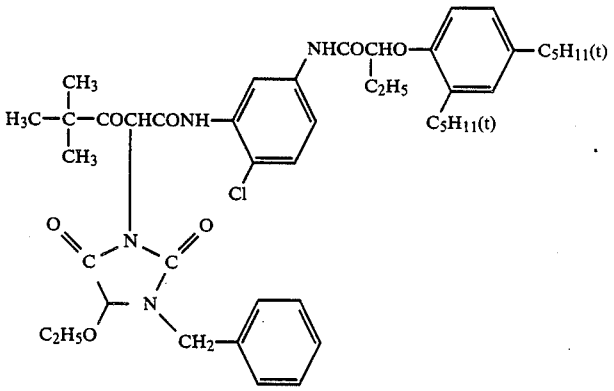

(*i) Coupler Solvent $(C_9H_{19}O)_3P{=}O$

-continued (*j) Coupler Solvent

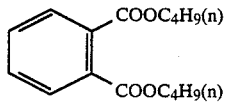

(*k) Ultraviolet Absorbent

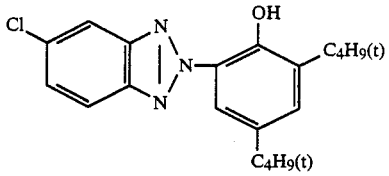

(*l) Ultraviolet Absorbent

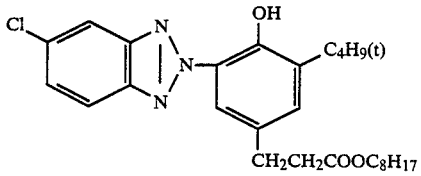

(*m) Ultraviolet Absorbent

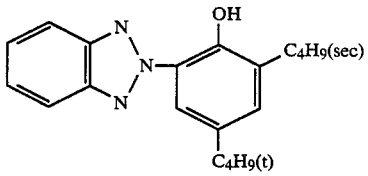

(*n) Cyan Coupler

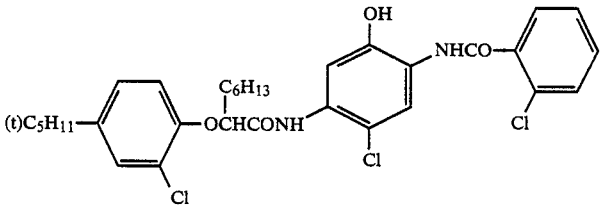

(*o) Cyan Coupler

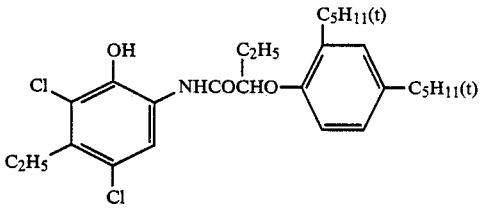

The following compounds were employed as spectral sensitizing dyes for the blue-sensitive emulsion layer and the red-sensitive emulsion layer.

Blue-Sensitive Emulsion Layer

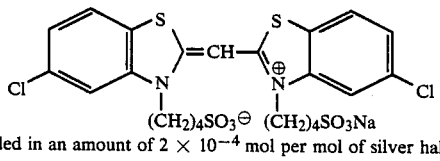

(added in an amount of $2 \times 10^{-4}$ mol per mol of silver halide)

Red-Sensitive Emulsion Layer

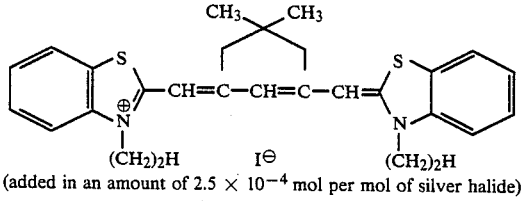

(added in an amount of $2.5 \times 10^{-4}$ mol per mol of silver halide)

The following dyes were employed as irradiation preventing dyes for the green-sensitive emulsion layer and the red-sensitive emulsion layer.

Green-Sensitive Emulsion Layer

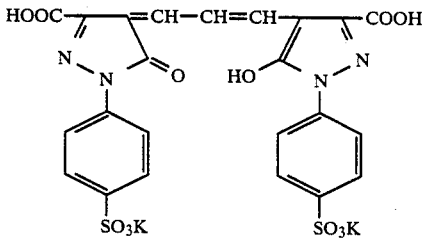

Red-Sensitive Emulsion Layer

-continued

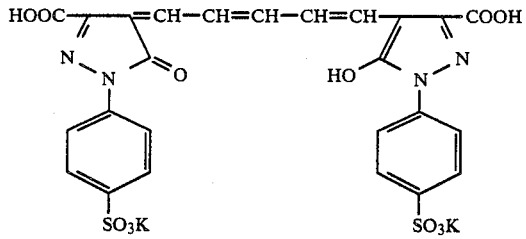

Details of the green-sensitive emulsion layer were as follows.

Emulsions 4 and 5 were prepared in the same manner as the silver halide emulsions in Example 1 except that the spectral sensitizing dyes shown in Table 4 were employed in place of those set forth in Table 1 and that amount thereof were so changed as to be shown in Table 4. These emulsions and the emulsions 1 and 2 were combined with the emulsified dispersion 2 prepared in Example 1 to prepare four kinds of coating compositions. Further, a hardener to be added to the protective layer was changed to the hardener shown in Table 5. Thus, eight kinds of samples were produced.

TABLE 4

| Emulsion | Spectral Sensitizing Dye | Amount Added per Mol of Silver Halide |
|---|---|---|
| Emulsion 4 | (IA-7) | 300 mg |
| Emulsion 5 | (IA-7)/(IIA-23) | 300 mg/60 mg |

TABLE 5

| Sample No. | Emulsion (silver coverage: 200 mg/m²) | Emulsified Dispersion | | Hardener Added to Protective Layer | Remarks |
|---|---|---|---|---|---|
| | | Third Layer: Green-Sensitive Emulsion Layer | | | |
| 13 | Emulsion 1 | Emulsified Dispersion 2 | | (III-1) | Comparison |
| 14 | Emulsion 2 | Magenta coupler (*f) | 600 mg/m² | 280 mg/m² | Invention |
| 15 | Emulsion 4 | Discoloration inhibitor (*b) | 300 mg/m² | | Comparison |
| 16 | Emulsion 5 | | | | Invention |
| 17 | Emulsion 1 | Coupler solvent (*d) | 1.20 ml/m² | *g | Comparison |
| 18 | Emulsion 2 | Gelatin | 1,800 mg/m² | 430 mg/m² | Comparison |
| 19 | Emulsion 4 | | | | Comparison |
| 20 | Emulsion 5 | | | | Comparison |

The keeping quality of these samples each was examined in the same manner as in Example 1. The results obtained are shown in Table 6.

TABLE 6

| Sample No. | Before Storage: Sensitivity of Green-Sensitive Layer | Before Storage: Fog Density (magenta density) | After Storage: Sensitivity of Green-Sensitive Layer | After Storage: Fog Density (magenta density) | Remarks |
|---|---|---|---|---|---|
| 13 | 100 | 0.05 | 95 | 0.12 | Comparison |
| 14 | 100 | 0.05 | 97 | 0.06 | Invention |
| 15 | 100 | 0.06 | 92 | 0.14 | Comparison |
| 16 | 100 | 0.05 | 93 | 0.07 | Invention |
| 17 | 100 | 0.07 | 116 | 0.24 | Comparison |
| 18 | 100 | 0.08 | 114 | 0.20 | Comparison |
| 19 | 100 | 0.07 | 110 | 0.25 | Comparison |
| 20 | 200 | 0.08 | 109 | 0.21 | Comparison |

TABLE 7

| Mixed Silver Chlorobromide | | Mean Grain Size ($\bar{\gamma}$) (Measured by Projected Area Method) (μm) | Coefficient of Variation* ($S/\bar{\gamma}$) | Mixed Ratio by Weight | Silver Bromide Content (mol %) |
|---|---|---|---|---|---|
| First Layer | Em a | 1 | 0.08 | 1/1 | 80 |
| | Em b | 0.75 | 0.07 | | 80 |
| Third Layer** | Em c | 0.5 | 0.09 | 3/7 | 70 |
| | Em d | 0.4 | 0.10 | | 70 |
| Fifth Layer | Em e | 0.5 | 0.09 | 3/7 | 70 |
| | Em f | 0.4 | 0.10 | | 70 |

*S stands for statistic standard deviation

**Each of Emulsion 1, 2, 4 and 5 is a mixed silver halide emulsion.

The combined use of at least two kinds of spectral sensitizing dyes and the hardener in accordance with the present invention showed a marked inhibition for increase in fog upon storage of unprocessed photographic materials.

While the invention has been described in detail and with reference to specific embodiments thereof, it will be apparent to one skilled in the art that various changes and modifications can be made therein without departing from the spirit and scope thereof.

What is claimed is:

1. A color photographic light-sensitive material which comprises a support having provided thereon at least one light-sensitive emulsion layer containing a silver chlorobromide emulsion substantially free of iodide, wherein at least one of said light-sensitive emulsion layers containing a silver halide emulsion sensitized spectrally with a combination of at least one compound represented by the general formula (I-A)

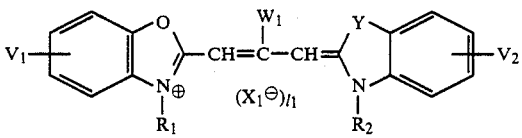

wherein $W_1$ represents a hydrogen atom, or an allkyl group; $V_1$ and $V_2$ may be the same or different, and each represents a hydrogen atom, a halogen atom, an alkyl group, an aryl group, an alkoxy group, an amido group, an alkoxycarbonyl group or a cyano group, and further, $V_1$ and $V_2$ may be a condensed benzene ring; the number of each substituent represented by $V_1$ and $V_2$ which may be present in a molecule is one or more; $R_1$ and $R_2$ each represents an alkyl group, an alkenyl group or an aralkyl group, each of which may be substituted with a sulfo group, a sulfonate group, a carboxyl group, a carboxylate group or a hydroxyl group directly or through a divalent alkoxy group; Y represents an oxygen atom; $X_1$, represents a counter ion which can suffice for neutralization of charges in each molecule; $l_1$ represents 0 or 1, and $l_1$ is 0 when the molecules form an inner salt; and at least one compound represented by the general formula (II-A) or (II-B):

(II-A)

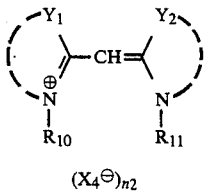

wherein $Y_1$ and $Y_2$ each represents atomic groups necessary to constitute a benzoxazole nucleus, a naphthoxazole nucleus, a bezothiazole nucleus or a naphthothiazole nucleus, each of which may substituted with a halogen atom, a hydroxyl group, an alkyl group, an alkoxy group, an aryl group, a cyano group, a nitro group or an alkoxycarbonyl group; $R_{10}$ and $R_{11}$ each represents an alkyl group, an alkenyl group or an aralkyl group each of which may be directly substituted with a sulfo group, a sulfonate group, a carboxyl group, a carboxylate group or a hydroxyl group, or indirectly substituted therewith through a divalent alkoxy group $X_4$ represents a counter ion which can suffice for neutralization of charges in the molecule; and $n_2$ represents 0 or 1, and $n_2$ is 0 when the compound forms an inner salt;

(II-B)

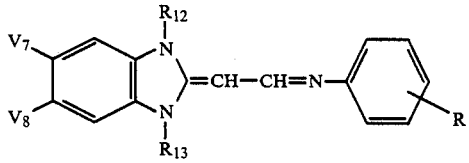

wherein $R_{12}$ and $R_{13}$ each represents an alkyl group, an alkenyl group or an aralkyl group, each of which may be substituted with a sulfo group, a sulfonate group, a carboxyl group, a carboxylate group, or a hydroxyl group directly or through a divalent alkoxy group; $V_7$ and $V_8$ may be the same or different and each represents a hydrogen atom, a halogen atom, an alkyl group, an aryl group, an alkoxy group, an amido group, an alkoxycarbonyl group or a cyano group; and R represents a hydrogen atom, a halogen atom, an alkyl group, an aryl group, an alkoxy group, an amido group, an alkoxycarbonyl group or a cyano group; and being hardened with at least one compound represented by the general formula (III) and/or at least one compound represented by the general formula (IV):

(III)

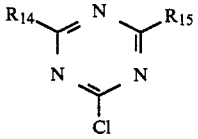

wherein $R_{14}$ and $R_{15}$ each represents a chlorine atom, —OM wherein M represents a hydrogen atom or a monovalent metal atom, an alkyl group, an alkoxy group,

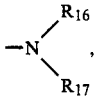

wherein $R_{16}$ and $R_{17}$ each represents a hydrogen atom, an alkyl group or an aryl group, or —$NHCOR_{18}$ wherein $R_{18}$ represents a hydrogen atom, an alkyl group, an aryl group or an alkylthio group, provided that the case of $R_{14}=R_{15}=Cl$ is excluded herein;

(IV)

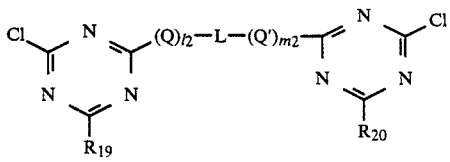

wherein $R_{19}$ and $R_{20}$ each represents a chlorine atom, —OM wherein M represents a hydrogen atom or a monovalent metal atom, an alkyl group or an alkoxy group; Q and Q' each represents —O—, —S—or —NH—; L represents an alkylene group or an arylene group; and $l_2$ and $m_2$ each represents 0 or 1.

2. A silver halide color photographic material of claim 1, wherein the silver chlorobromide emulsion has a chloride content of 80 mole % or less.

3. A silver halide color photographic material of claim 1, wherein $W_1$ represents an ethyl group or a propyl group, and $W_2$ represents a hydrogen atom.

4. A silver halide color photographic material of claim 1, wherein $V_1$ represents a phenyl group.

5. A silver halide color photographic material of claim 1, wherein $R_1$ and $R_2$ each represents an alkyl group containing 1 to 5 carbon atoms or an aralkyl group containing 7 to 10 carbon atoms.

6. A silver halide color photographic material of claim 1, wherein at least one of $R_1$ and $R_2$ present in the same molecule represents an alkyl or aralkyl group substituted with a sulfo group, a sulfonate group, a carboxyl group, a carboxylate group or a hydroxyl group.

7. A silver halide color photographic material of claim 1, wherein at least either $R_{10}$ or $R_{11}$ represents an alkyl or aralkyl group substituted with a sulfo group, a sulfonate group, a carboxyl group, a carboxylate group or a hydroxyl group.

8. A silver halide color photographic material of claim 1, wherein both $R_{12}$ and $R_{13}$ are a substituted or unsubstituted alkyl group.

9. A silver halide color photographic material of claim 1, wherein $V_7$ and $V_8$, which may be the same or different, each represents a trifluoromethyl group, a chlorine atom, an alkoxycarbonyl group, or a cyano group.

10. A silver halide color photographic material of claim 1, wherein a the ratio of the compound represented by the general formulae (II-A) and (II-B) to the compounds represented by the general formula (I-A), in which the individual, when one compound alone is added, or the whole, when two or more compounds are added as a mixture, ranges from 2 to 70 mol %.

11. A silver halide color photographic material of claim 10, wherein the ratio ranges from 5 to 50 mol %.

12. A silver halide color photographic material of claim 1, wherein the combination of at least one compound represented by the general formula (I-A) and at least one compound represented by the general formula (II-A) or (II-B) is added to the silver halide emulsion during formation of silver halide grains, in the interval between grain formation and chemical ripening, during chemical ripening, after the conclusion of chemical ripening, or at the time of preparation of the coating composition.

13. A silver halide color photographic material of claim 12, wherein the compound represented by the general formula (II-A) or (II-B) is added simultaneously with or prior to addition of the compound represented by the general formula (I-A).

14. A silver halide color photographic material of claim 12, wherein the compound represented by the general formula (I-A) and the compound represented by the general formula (II-A) or (II-B) are added in a form of a mixture solution.

15. A silver halide color photographic material of claim 1, wherein either $R_{14}$ or $R_{15}$ represents a chlorine atom; when $R_{14}$ or $R_{15}$ is represented by —OM, M represents a sodium atom or a potassium atom; or when $R_{14}$ or $R_{15}$ represents an alkyl group or an alkoxy group, the alkyl group is a methyl group, an ethyl group or a butyl group, and the alkoxy group is a methoxy group, an ethoxy group or a butoxy group.

16. A silver halide color photographic material of claim 1, wherein L represents $—CH_2—$, $—(CH_2)_2—$,

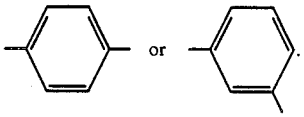

17. A silver halide color photographic material of claim 1, wherein the amount of the compound represented by the general formula (III) is 0.05 to 15 wt % to the total gelatin content.

18. A silver halide color photographic material of claim 1, wherein said at least one light-sensitive emulsion layer containing the silver chlorobromide emulsion substantially free of iodide contains a monodispersed silver halide emulsion having a variation rate within 15%.

19. A silver halide color photographic material of claim 18, wherein the variation rate is within 10%.

20. A silver halide color photographic material of claim 18, wherein said monodispersed silver halide emulsion is coated in a single layer as a mixture, or coated separately in a multilayer.

21. A silver halide color photographic material of claim 1, wherein the silver halide grains to be employed have a regular crystal form.

22. A silver halide color photographic material of claim 1, wherein the emulsion in which the tabular silver halide grains having a length/thickness ratio of 5 or more are contained in a fraction of 50% or more on a basis of the total projected area of all grains is employed.

23. A silver halide color photographic material of claim 22, wherein said length/thickness ratio is 8 or more.

24. A silver halide color photographic material of claim 1, wherein said at least one light-sensitive emulsion layer containing the silver chlorobromide emulsion substantially free of iodide comprises a silver chlorobromide emulsion prepared using a silver halide solvent present upon precipitation, physical ripening or chemical ripening.

25. A silver halide color photographic material of claim 1, wherein the following combination of compounds of the general formulae is used: (I-A), (II-A) and (III).

26. A silver halide color photographic material of claim 1, wherein the following combination of compounds of the general formulae is used: (I-A). (II-B) and (III).

27. A silver halide color photographic material of claim 1, wherein the following combination of compounds of the general formulae is used: (I-A), (II-A) and (IV).

28. A silver halide color photographic material of claim 1, wherein the following combination of compounds of the general formulae is used: (I-A, (II-b) and (IV).

* * * * *